US012052500B2

(12) United States Patent
Shinzato et al.

(10) Patent No.: US 12,052,500 B2
(45) Date of Patent: Jul. 30, 2024

(54) CONTROL APPARATUS, IMAGE PICKUP APPARATUS, LENS APPARATUS, CAMERA SYSTEM, CONTROL METHOD, AND MEMORY MEDIUM THAT CONTROL IMAGE STABILIZATION

(71) Applicant: CANON KABUSHIKI KAISHA, Tokyo (JP)

(72) Inventors: Yuki Shinzato, Tochigi (JP); Tomoki Tokita, Tochigi (JP); Tomohiro Ino, Tochigi (JP); Satoshi Maetaki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 227 days.

(21) Appl. No.: 17/701,816

(22) Filed: Mar. 23, 2022

(65) Prior Publication Data

US 2022/0321786 A1 Oct. 6, 2022

(30) Foreign Application Priority Data

Mar. 25, 2021 (JP) ................................ 2021-050960

(51) Int. Cl.

| | |
|---|---|
| ***H04N 23/68*** | (2023.01) |
| ***G02B 27/64*** | (2006.01) |
| ***H04N 23/55*** | (2023.01) |

(52) U.S. Cl.

CPC ......... *H04N 23/687* (2023.01); *G02B 27/646* (2013.01); *H04N 23/55* (2023.01)

(58) Field of Classification Search

CPC .. H04N 23/687; H04N 23/55; H04N 23/6842; H04N 23/685; G02B 27/646; G02B 15/14

See application file for complete search history.

(56) References Cited

U.S. PATENT DOCUMENTS 6,414,800 B1 * 7/2002 Hamano ........ G02B 15/144113 359/747
9,470,904 B2 * 10/2016 Nanba ............ G02B 15/144105
(Continued)

FOREIGN PATENT DOCUMENTS

| | | |
|---|---|---|
| JP | 2006129175 A | 5/2006 |
| JP | 2007233166 A | 9/2007 |
| JP | 2018173632 A | 11/2018 |

OTHER PUBLICATIONS

Extended European Search Report issued in European Appln. No. 22163590.7 mailed Aug. 8, 2022.

*Primary Examiner* — Chiawei Chen

(74) *Attorney, Agent, or Firm* — ROSSI, KIMMS & McDOWELL LLP

(57) ABSTRACT

A control apparatus comprising at least one processor or circuit configured to execute a plurality of tasks includes a first acquisition task configured to acquire information on image shift sensitivity relative to decentering of an image stabilizing optical system, the information being associated with an image point position of an image pickup optical system, the image pickup optical system including the image stabilizing optical system configured to perform image stabilization, and a second acquisition task configured to acquire a first image stabilizing driving amount of the image stabilizing optical system during the image stabilization. The second acquisition task is configured to acquire the first image stabilizing driving amount associated with a predetermined image point position by using the information on the image shift sensitivity associated with the predetermined image point position.

22 Claims, 16 Drawing Sheets

(56) References Cited

U.S. PATENT DOCUMENTS

| | | | | |
|---|---|---|---|---|
| 11,800,226 | B2 * | 10/2023 | Shinzato | H04N 23/6812 |
| 2014/0118603 | A1 * | 5/2014 | Saito | G02B 27/646<br>348/340 |
| 2015/0185494 | A1 * | 7/2015 | Nanba | G02B 15/145121<br>359/557 |
| 2015/0358545 | A1 * | 12/2015 | Wakamatsu | H04N 25/63<br>348/208.1 |
| 2016/0255273 | A1 * | 9/2016 | Wakamatsu | H04N 23/687<br>348/208.99 |
| 2022/0174216 | A1 * | 6/2022 | Ozone | H04N 23/683 |
| 2022/0284604 | A1 * | 9/2022 | Schumann | G06T 7/32 |
| 2023/0333401 | A1 * | 10/2023 | Aoi | H04N 23/55 |

* cited by examiner

IMAGE POINT POSITION 11 (r11, θ11)

IMAGE POINT POSITION 12 (r12, θ12)

IMAGE POINT POSITION 21 (r21, θ21)

IMAGE POINT POSITION

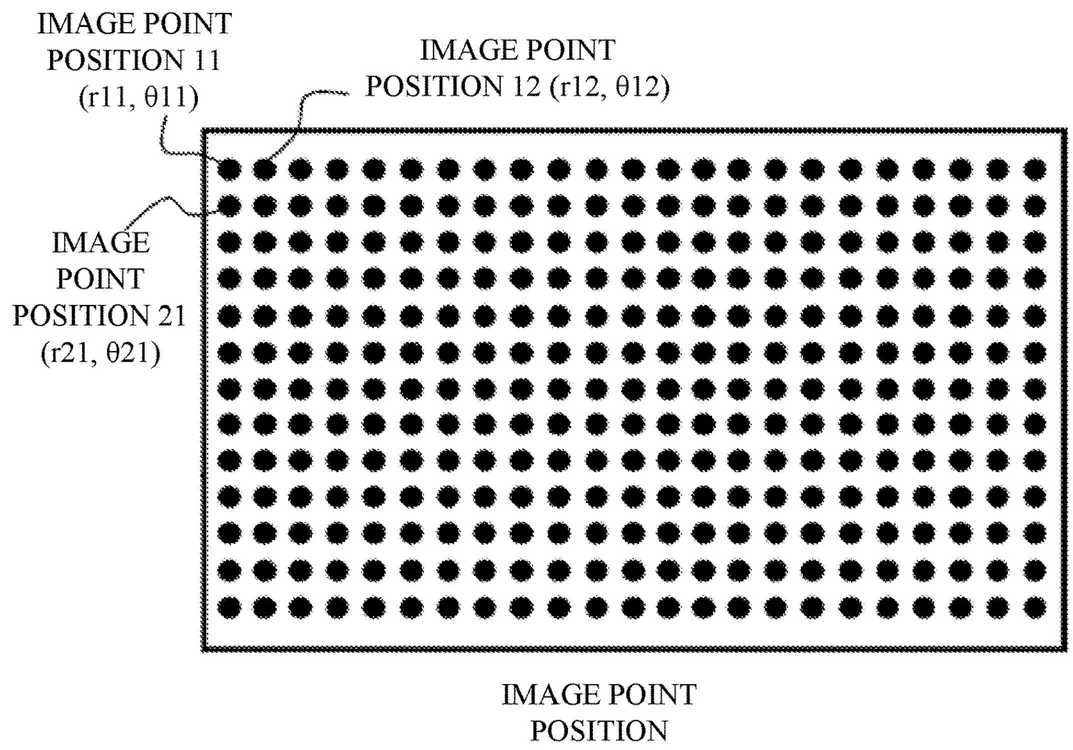

FIG. 5A

INFORMATION ON FOUR IMAGE STABILIZATION COEFFICIENTS OF IMAGE POINT POSITION 11

INFORMATION ON FOUR IMAGE STABILIZATION COEFFICIENTS OF IMAGE POINT POSITION 12

$K_{LS1}(r11, θ11)$ $K_{LS1}(r12, θ12)$
$K_{LS2}(r11, θ11)$ $K_{LS2}(r12, θ12)$ * * * * * * * *
$K_{LS3}(r11, θ11)$ $K_{LS3}(r12, θ12)$
$K_{LS4}(r11, θ11)$ $K_{LS4}(r12, θ12)$ $K_{LS1}(r21, θ21)$
$K_{LS2}(r21, θ21)$ * * * * * * * * * *
$K_{LS3}(r21, θ21)$
$K_{LS4}(r21, θ21)$

INFORMATION ON FOUR IMAGE STABILIZATION COEFFICIENTS OF IMAGE POINT POSITION 21

IMAGE STABILIZATION COEFFICIENT TABLE

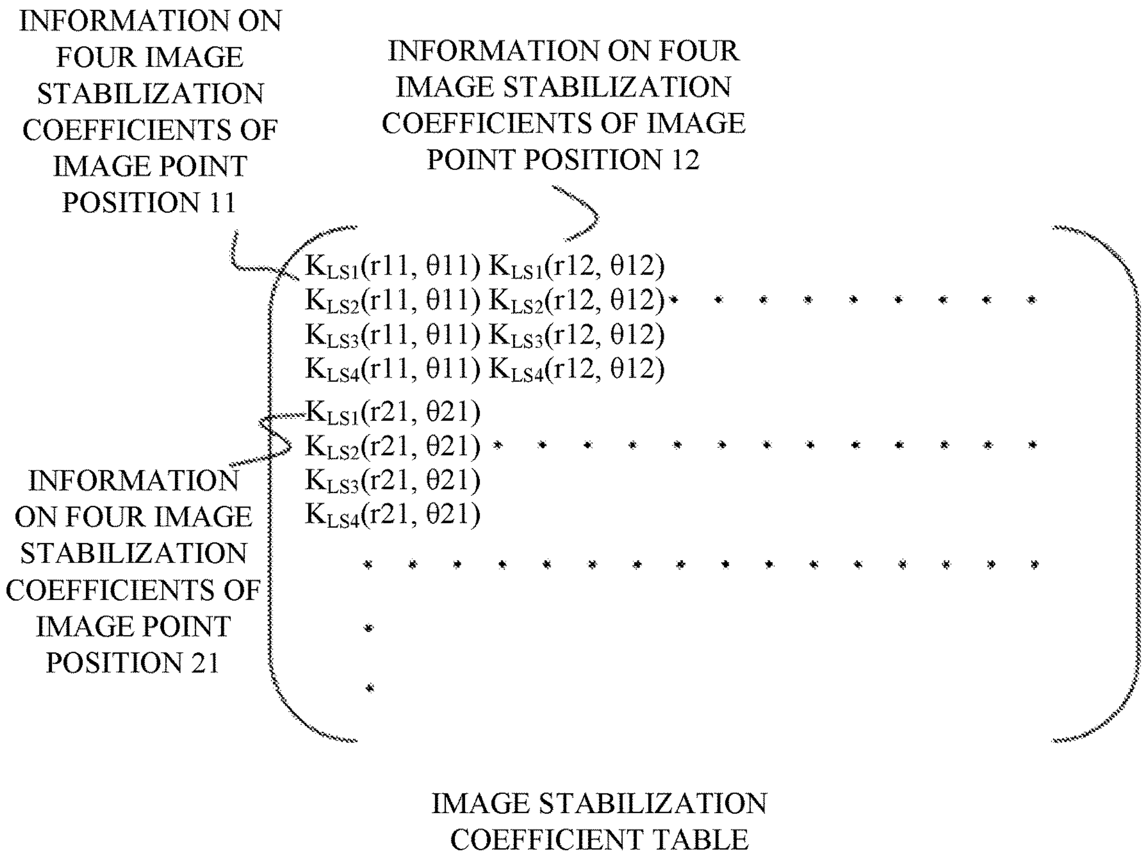

FIG. 5B

PRINCIPAL RAY AT HALF ANGLE OF VIEW OF 0

PRINCIPAL RAY AT HALF ANGLE OF VIEW OF ω

MOVING AMOUNT $\Delta y_{LS}(h)$ OF IMAGING POSITION OF PRINCIPAL RAY AT HALF ANGLE OF VIEW OF ω

PRINCIPAL RAY AT HALF ANGLE OF VIEW OF 0

TILT ANGLE $\omega_x$

MOVING AMOUNT $\Delta y_{LS}(0)$ OF IMAGING POSITION OF PRINCIPAL RAY AT HALF ANGLE OF VIEW OF 0

PRINCIPAL RAY AT HALF ANGLE OF VIEW OF ω

PRIOR ART

STARTING POINT OF ARROW:
IMAGE POINT POSITION OF STATIONARY OBJECT IMAGE
END POINT OF ARROW:
IMAGE POINT POSITION WHEN ROTATIONAL SHAKE OCCURS

STARTING POINT OF ARROW:
IMAGE POINT POSITION OF STATIONARY OBJECT IMAGE
END POINT OF ARROW:
IMAGE POINT POSITION OF OBJECT IMAGE AFTER IMAGE STABILIZATION

CONTROL APPARATUS, IMAGE PICKUP APPARATUS, LENS APPARATUS, CAMERA SYSTEM, CONTROL METHOD, AND MEMORY MEDIUM THAT CONTROL IMAGE STABILIZATION

BACKGROUND OF THE INVENTION

Field of the Invention

The present disclosure relates to a control apparatus, an image pickup apparatus, a lens apparatus, a camera system, a control method, and a memory medium, each of which controls image stabilization.

Description of the Related Art

When an optical system using a central projection method is used, an image point movement on an image pickup plane differs between a central part of an image and a peripheral part of the image, the image point movement being caused by a camera shake. As illustrated in FIG. 18A, the image point moving amount in the peripheral part of the image is larger than the image point moving amount in the central part of the image. Therefore, as illustrated in FIG. 18B, even when the image stabilization is performed, image points in the peripheral part of the image remain moved more largely than image points in the central part of the image. Japanese Patent Application Laid-Open No. ("JP") 2018-173632 discloses an image pickup apparatus that reduces image blur at an image point position in a peripheral part of an image in consideration of a difference between an image blur amount in a central part of the image and an image blur amount at a predetermined image point position, the difference being caused by the central projection method.

In JP 2018-173632, the image pickup apparatus calculates an image stabilization amount for reducing the image blur at the predetermined image point position in consideration of image shift sensitivity relative to a tilt of an optical system, the image shift sensitivity depending on an image height of an object image. However, in a case where image stabilization is performed by a lens-shift type image stabilizing mechanism, an image shift sensitivity relative to decentering of the image stabilizing optical system has characteristics different from the image shift sensitivity relative to the tilt of the optical system. Therefore, in a case where image stabilization is performed for image blur at the predetermined image point position by using the image stabilizing optical system, if the image stabilization amount is not calculated in consideration of the image shift sensitivity relative to the decentering of the image stabilizing optical system for the image point position, the image stabilization may be insufficient or excessive.

SUMMARY OF THE INVENTION

The present disclosure provides a control apparatus, an image pickup apparatus, a lens apparatus, a camera system, a control method, and a memory medium each of which can easily reduce well image blur at a predetermined image point position including a center of an optical axis.

A control apparatus according to one aspect of embodiments of the disclosure includes at least one processor or circuit configured to execute a plurality of tasks including a first acquisition task configured to acquire information on image shift sensitivity relative to decentering of an image stabilizing optical system, the information being associated with an image point position of an image pickup optical system, the image pickup optical system including the image stabilizing optical system configured to perform image stabilization, and a second acquisition task configured to acquire a first image stabilizing driving amount of the image stabilizing optical system during the image stabilization. The second acquisition task is configured to acquire the first image stabilizing driving amount associated with a predetermined image point position by using the information on the image shift sensitivity associated with the predetermined image point position.

An image pickup apparatus and a lens apparatus each including the above control apparatus also constitute other aspects of embodiments of the disclosure.

A camera system according to one aspect of embodiments of the disclosure includes at least one processor or circuit configured to execute a plurality of tasks including a first acquisition task configured to acquire information on image shift sensitivity relative to decentering of an image stabilizing optical system, the information being associated with an image point position of an image pickup optical system, the image pickup optical system including the image stabilizing optical system configured to perform image stabilization and a second acquisition task configured to acquire a first image stabilizing driving amount of the image stabilizing optical system during the image stabilization, a lens apparatus, and an image pickup apparatus. The lens apparatus is configured to acquire the first image stabilizing driving amount associated with a predetermined image point position by using the information on the image shift sensitivity associated with the predetermined image point position. The second acquisition task includes a third acquisition task configured to acquire information with which a moving amount of the predetermined image point position relative to a tilt of the image pickup optical system can be acquired, and a fourth acquisition task configured to acquire a second image stabilizing driving amount of an image stabilizing unit during image stabilization, the image stabilizing unit being configured to perform the image stabilization. The image pickup apparatus is configured to acquire the second image stabilizing driving amount associated with the predetermined image point position by using the information with which the moving amount of the predetermined image point position relative to the tilt of the image pickup optical system can be acquired.

A control method according to one aspect of embodiments of the disclosure is a control method for acquiring an image stabilizing driving amount of an image stabilizing optical system during image stabilization, the image stabilizing optical system being configured to perform the image stabilization. The control method includes acquiring information on image shift sensitivity relative to decentering of the image stabilizing optical system, the information being associated with an image point position of an image pickup optical system, and acquiring an image stabilizing driving amount of the image stabilizing optical system associated with a predetermined image point position by using the information on the image shift sensitivity associated with the predetermined image point position.

Anon-transitory computer-readable storage medium according to one aspect of embodiments of the disclosure stores a computer program that causes a computer to execute the above control method.

Further features of the present invention will become apparent from the following description of exemplary embodiments with reference to the attached drawings.

BRIEF DESCRIPTION OF THE DRAWINGS

FIG. 5A is a diagram illustrating an image point position on an image pickup plane. FIG. 5B is a diagram illustrating an image stabilization coefficient table including image stabilization coefficient information associated with the image point positions.

DESCRIPTION OF THE EMBODIMENTS

Figure 1:
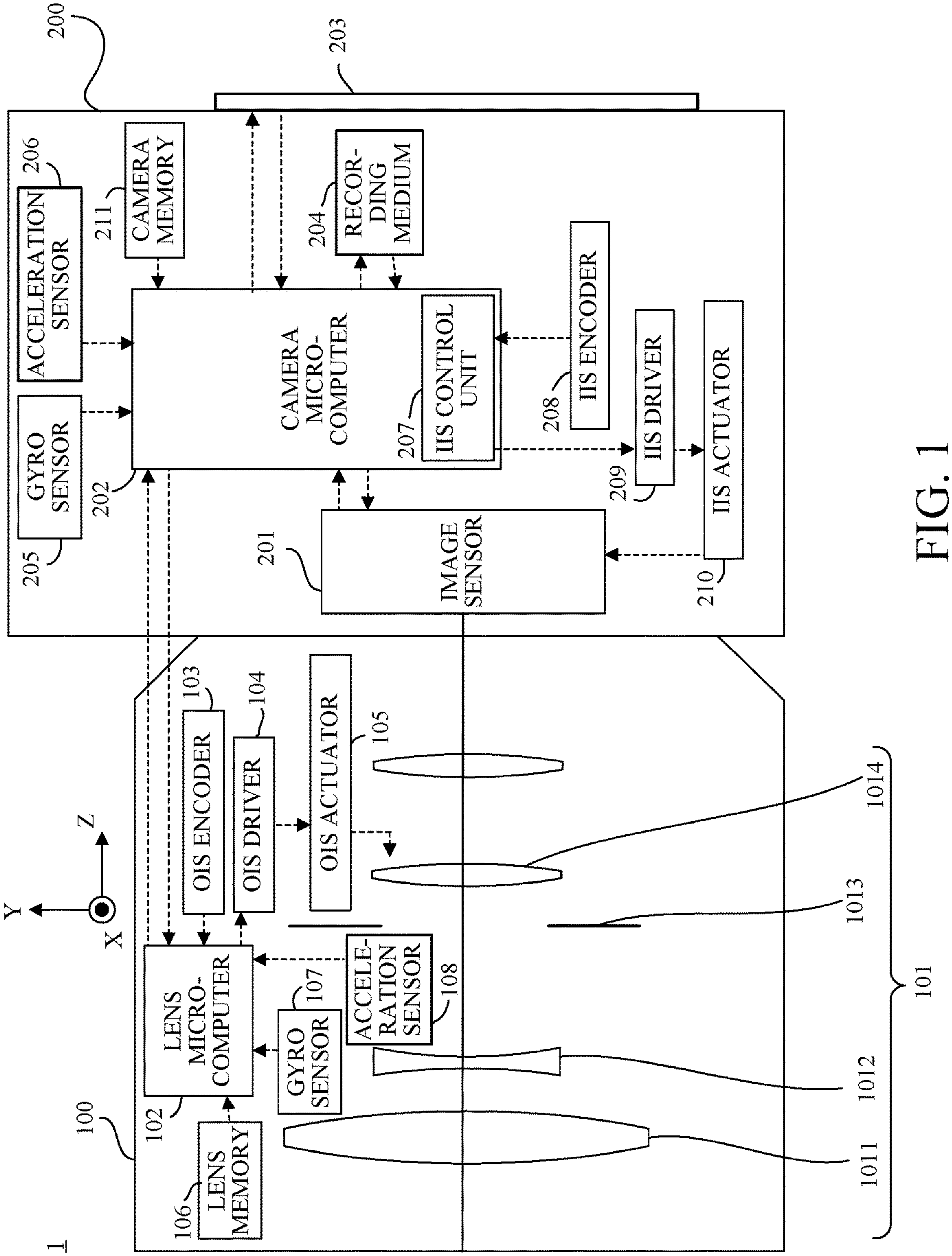
FIG. 1 is a schematic configuration diagram illustrating an image pickup system according to a first embodiment.

Referring now to the accompanying drawings, a description will be given of embodiments according to the present invention. Corresponding elements in respective figures will be designated by the same reference numerals, and a description thereof will be omitted.

In the following description, in a three-dimensional orthogonal coordinate system of an X-axis direction, a Y-axis direction, and a Z-axis direction, a long side direction of an image pickup plane is the X-axis direction, a short side direction of the image pickup plane is the Y-axis direction, and an optical axis direction of the image pickup optical system is the Z-axis direction.

First Embodiment

FIG. 1 is a schematic configuration diagram illustrating an image pickup system (camera system) 1 of this embodiment. The image pickup system 1 includes a lens apparatus 100 and an image pickup apparatus 200. The lens apparatus 100 includes an image pickup optical system 101, a lens microcomputer 102, an OIS encoder 103, an OIS driver 104, an OIS actuator 105, and a lens memory (memory unit) 106. OIS is image stabilization performed by moving an image stabilizing optical system 1014 included in the image pickup optical system 101. The image pickup apparatus 200 includes an image sensor 201, a camera microcomputer 202, a display-operation unit 203, and a recording medium 204. The image pickup apparatus 200 further includes a gyro sensor 205, an acceleration sensor 206, an IIS encoder 208, an IIS driver 209, an IIS actuator 210, and a camera memory (memory unit) 211. IIS is image stabilization performed by moving the image sensor 201. The lens microcomputer 102 and the camera microcomputer 202 may be configured as control apparatuses separate from the lens apparatus 100 and the image pickup apparatus 200, respectively.

The image pickup optical system 101 includes a focusing optical system 1011, a zooming optical system 1012, a diaphragm 1013, and the image stabilizing optical system 1014. The image pickup optical system 101 guides rays from an object at an in-focus position in a set angle of view so that an object image is formed on an image pickup plane of the image sensor 201. The focusing optical system 1011 performs focusing. The zooming optical system 1012 varies magnification so as to vary an image pickup angle of view. The diaphragm 1013 adjusts a light amount captured from an object. The image stabilizing optical system 1014 is decentered from an optical axis of the image pickup optical system 101 so that image blur is reduced, the image blur occurring when a still image or a motion image is captured.

The lens microcomputer 102 controls the image stabilizing optical system 1014. Specifically, the lens microcomputer 102 determines an OIS driving amount of the OIS actuator 105 by using an image stabilizing driving amount output from the camera microcomputer 202 and a position signal output from the OIS encoder 103 configured to detect a position of the image stabilizing optical system 1014. The lens microcomputer 102 determines the OIS driving amount such that it does not exceed a movable range of the OIS actuator 105. When the OIS actuator 105 receives an OIS driving amount signal output from the OIS driver 104, the OIS actuator 105 decenters the image stabilizing optical system 1014 with respect to the optical axis of the image pickup optical system 101 by moving the image stabilizing optical system 1014 in a direction including a component in a direction orthogonal to the Z-axis direction and performs image stabilization.

The lens memory 106 stores information on optical design such as information on a focal length and information on an object distance of the image pickup optical system 101. The information on the optical design includes information on tilt-image shift sensitivity for each image height of the image pickup optical system 101 (information on image shift sensitivity relative to a tilt of the image pickup optical system 101, the information being associated with the image point position of the image pickup optical system 101). The information on the optical design further includes information on decentering-image shift sensitivity for each image height of the image stabilizing optical system 1014 (information on image shift sensitivity relative to decentering of the image stabilizing optical system 1014, the information being associated with the image point position of the image pickup optical system 101). In a case where a rotational shake occurs in the image pickup system 1 and an XY-plane orthogonal to the optical axis tilts with respect to the optical axis, using the information on the tilt-image shift sensitivity and the information on the decentering-image shift sensitivity makes it possible to reduce well image blur at a predetermined image point position of the image pickup optical system 101. The camera memory 211 may store the information on the optical design of the image pickup optical system 101 including the information on the tilt-image shift sensitivity and the information on the decentering-image shift sensitivity. Alternatively, both the lens memory 106 and the camera memory 211 may store the information on the optical design of the image pickup optical system 101 including the information on the tilt-image shift sensitivity and the information on the decentering-image shift sensitivity.

The image sensor 201 is a charge-coupled device (CCD) image sensor, a complementary-metal oxide semiconductor (CMOS) image sensor, or another image sensor. The image sensor 201 converts an object image formed on the image pickup plane of the image sensor 201 by the image pickup optical system 101 into an electric signal and outputs it as an image signal. The image signal, which is an analog signal, is converted into a digital signal by an A/D converter (not illustrated) and output.

The camera microcomputer 202 controls the entire image pickup system 1. For example, the camera microcomputer 202 reads out the image signal from the image sensor 201 as image data. Thereafter, the camera microcomputer 202 performs, on the image data, processing such as image processing based on the information on the optical design, processing of displaying the image data on a display-operation unit 203, and processing of storing the image data on the recording medium 204. The camera microcomputer 202 transmits, to the lens microcomputer 102, instructions such as instructions for focusing, magnification variation, and diaphragm adjustment of the image pickup optical system 101. Some of the settings relating to the above-described processing may be changed by an operation unit such as the display-operation unit 203 and a button (not illustrated).

Figure 2:
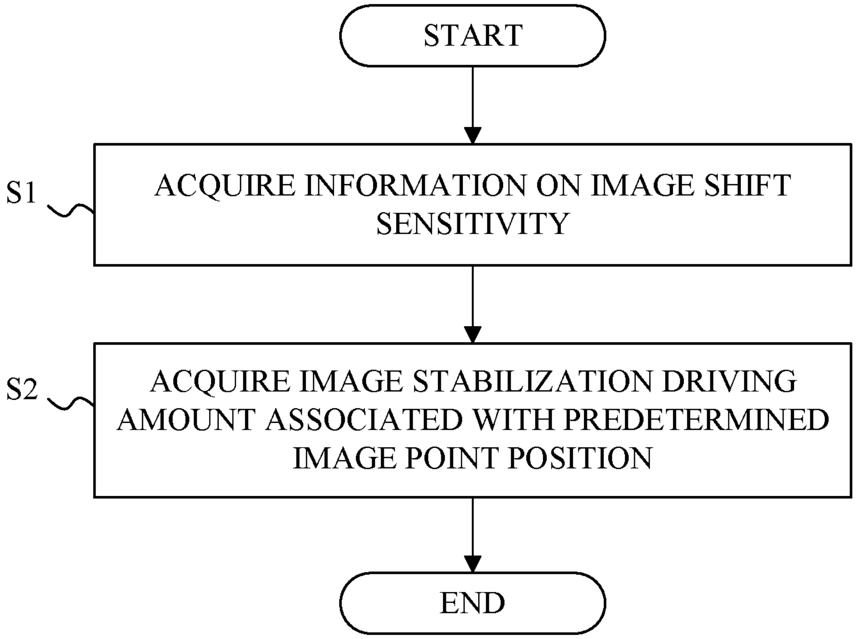
FIG. 2 is a flowchart illustrating a control method for acquiring an image stabilizing driving amount according to the first embodiment.

The camera microcomputer 202 acquires the image stabilizing driving amount (image stabilizing driving amount of the image stabilizing optical system 1014 during image stabilization) according to a flow of FIG. 2. FIG. 2 is a flowchart of a control method for acquiring the image stabilizing driving amount, the control method being performed by the camera microcomputer 202. In a first acquisition step S1, the camera microcomputer 202 functions as a first acquisition unit and acquires information on image shift sensitivity relative to decentering of the image stabilizing optical system 1014, the information being associated with the image point position of the image pickup optical system 101. In a second acquisition step S2, the camera microcomputer 202 functions as a second acquisition unit and acquires an image stabilizing driving amount associated with a predetermined image point position by using information on image shift sensitivity relative to decentering of the image stabilizing optical system 1014, the information being associated with the predetermined image point position. The camera microcomputer 202 may calculate the image stabilizing driving amount or may acquire it from a table stored in a server, memory, or the like. In this embodiment, the camera microcomputer 202 functions as the first acquisition unit and the second acquisition unit, but the lens microcomputer 102 may function as the first acquisition unit and the second acquisition unit.

The gyro sensor 205 outputs, as a motion detection signal, information on angular velocity of the image pickup system 1. The acceleration sensor 206 outputs, as a motion detection signal, information on a moving amount in a translational direction of the image pickup system 1. In response to a reception of the motion detection signal transmitted from each sensor, the camera microcomputer 202 transmits the image stabilizing driving amount to the lens microcomputer 102 or the IIS control unit 207 in the camera microcomputer 202, and image stabilization is performed on the object image in which image blur is caused by a shake of the image pickup system 1. In the image stabilization, either OIS or IIS may be performed, or a share of the image stabilization may be determined (for example, 50% of the image stabilization is performed by OIS, and 50% of the image stabilization is performed by IIS) and both OIS and IIS may be performed.

The IIS control unit 207 controls the image sensor 201. Specifically, the IIS control unit 207 determines an IIS driving amount of the IIS actuator 210 by using the image stabilizing driving amount transmitted from the camera microcomputer 202 and the position signal output from the IIS encoder 208 configured to detect the position of the image sensor 201. The IIS driving amount is determined such that it does not exceed the movable range of the IIS actuator 210. In response to a reception of the IIS driving amount signal from the IIS driver 209, the IIS actuator 210 decenters the image sensor with respect to the optical axis of the image pickup optical system 101 by moving the image sensor 201 in the direction including the component in the direction orthogonal to the Z-axis direction and performs image stabilization. That is, the IIS actuator 210 functions as one of image stabilizing units for reducing image blur.

The lens apparatus 100 may include a gyro sensor 107 or an acceleration sensor 108. In this case, when OIS is to be performed, the lens microcomputer 102 can determine the OIS driving amount by using an image stabilizing driving amount acquired by using the motion detection signals output from these sensors and the position signal output from the OIS encoder 103.

Hereinafter, a description will be given of processing in OIS in a case where image blur at a predetermined image point position is to be reduced. When the gyro sensor 205 or the acceleration sensor 206 detects a shake of the image pickup system 1, each sensor outputs the motion detection signal (information on the shake) to the camera microcomputer 202. The camera microcomputer 202 acquires the image stabilizing driving amount by using the information on the tilt-image shift sensitivity and the information on the decentering-image shift sensitivity stored in the lens memory 106, information on the image stabilizing position on the image pickup plane, and the motion detection signal. The camera microcomputer 202 transmits the acquired image stabilizing driving amount to the lens microcomputer 102 or the IIS control unit 207.

Acquisition of Information on Tilt-Image Shift Sensitivity

Figure 3A:
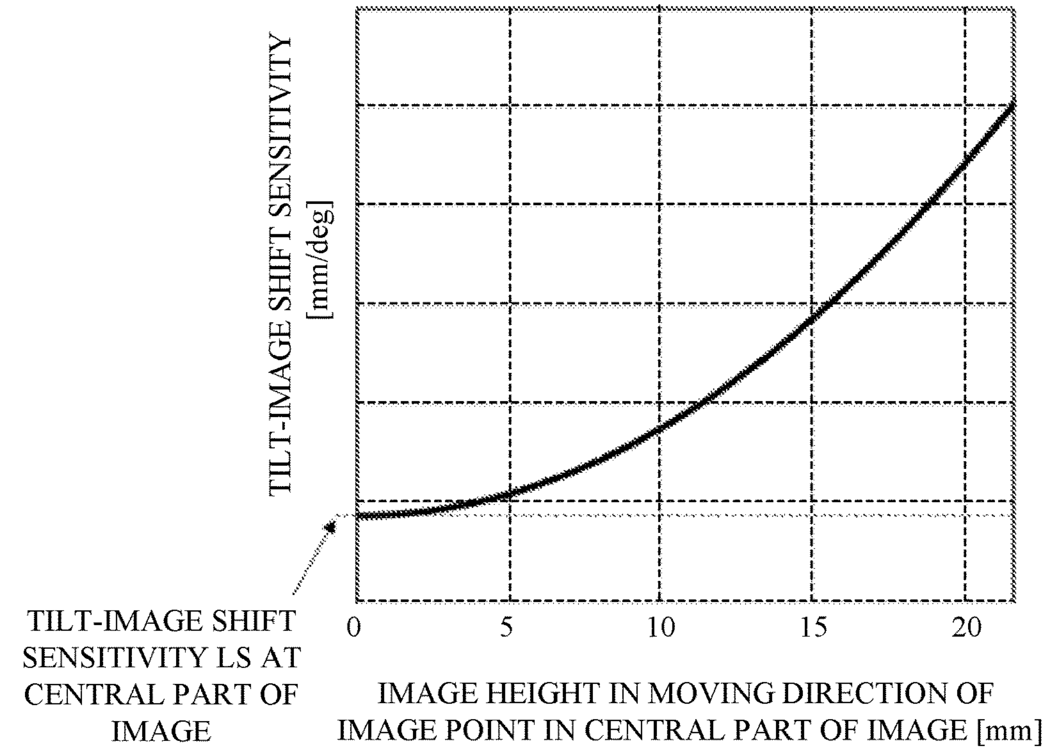
FIG. 3A illustrates a relationship between an image height and a tilt-image shift sensitivity in a central part of an image, the image height being in a moving direction of an image point in a case where an image pickup optical system according to the first embodiment tilts.
Figure 3B:
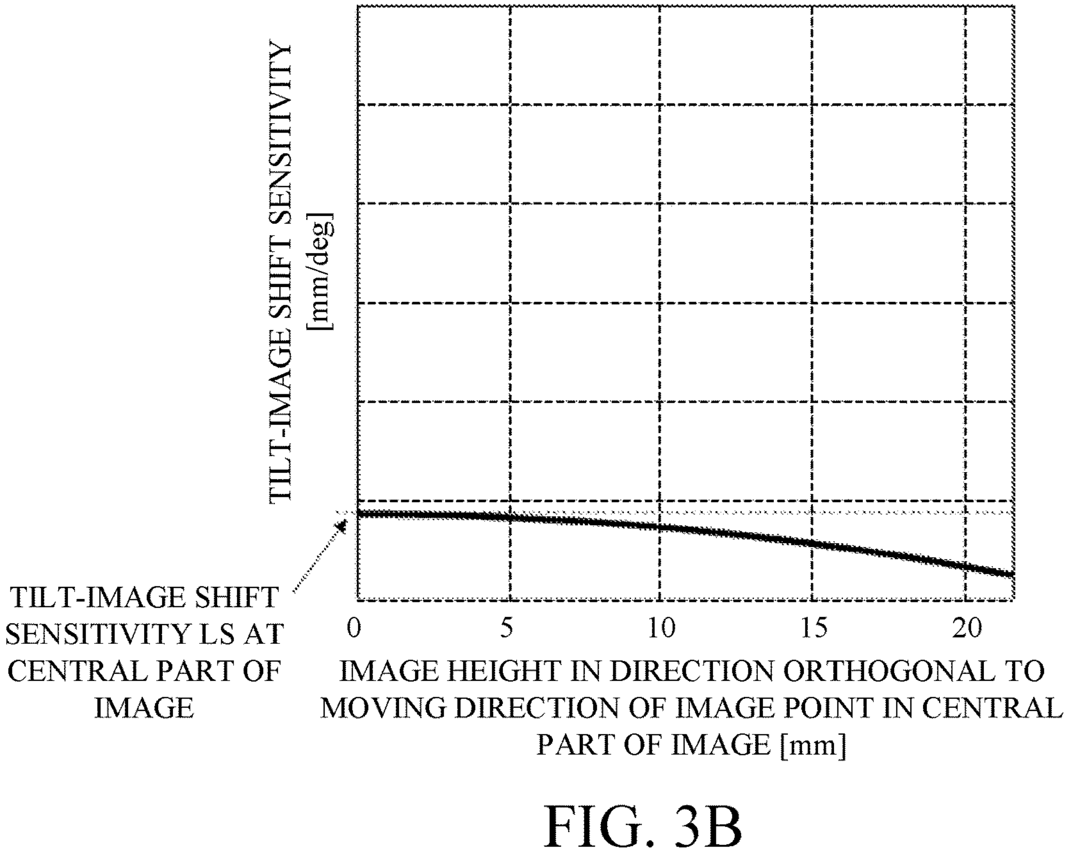
FIG. 3B illustrates a relationship between an image height and a tilt-image shift sensitivity in the central part of the image, the image height being in a direction orthogonal to the moving direction of the image point in the case where the image pickup optical system according to the first embodiment tilts.

In this embodiment, the tilt-image shift sensitivity is an image point moving amount in directions orthogonal to and parallel to a predetermined rotational axis about which the image pickup optical system 101 tilts, the predetermined rotational axis being orthogonal to the optical axis of the image pickup optical system 101 and intersecting with the optical axis on the image pickup plane. FIG. 3A illustrates a relationship between the image height and the tilt-image shift sensitivity in a case where the image pickup optical system 101 of this embodiment tilts, the image height being in a moving direction of an image point and in a central part of an image. As indicated by FIG. 3A, the higher the image height in the moving direction of the image point, the larger the image point moving amount when the image pickup optical system 101 tilts, the image pickup optical system being designed to optically reduce an aberration by a central projection method. FIG. 3B illustrates a relationship between an image height and the tilt-image shift sensitivity in the case where the image pickup optical system 101 of this embodiment tilts, the image height being in a direction orthogonal to the moving direction of the image point and in the central part of the image. As indicated by FIG. 3B, the higher the image height in the direction orthogonal to the moving direction of the image point, the smaller the image point moving amount when the image pickup optical system 101 tilts, the image pickup optical system 101 being designed to be capable of barrel aberration reduction by the central projection method. In this embodiment, an image point moving amount for each image height in a case where a rotational shake occurs can be acquired by using the tilt-image shift sensitivity, which is acquired by using a design value of the image pickup optical system 101, and it is not necessary to perform arithmetic processing using an image height expression based on the projection method or using a distortion amount. The tilt-image shift sensitivity of this embodiment is a value acquired by dividing, by 0.5°, the image point moving amount when the image pickup optical system 101 tilts by 0.5° about the predetermined rotation axis. The tilt angle of the pickup optical system 101 is not limited to 0.5° and may be properly set.

Figure 4:
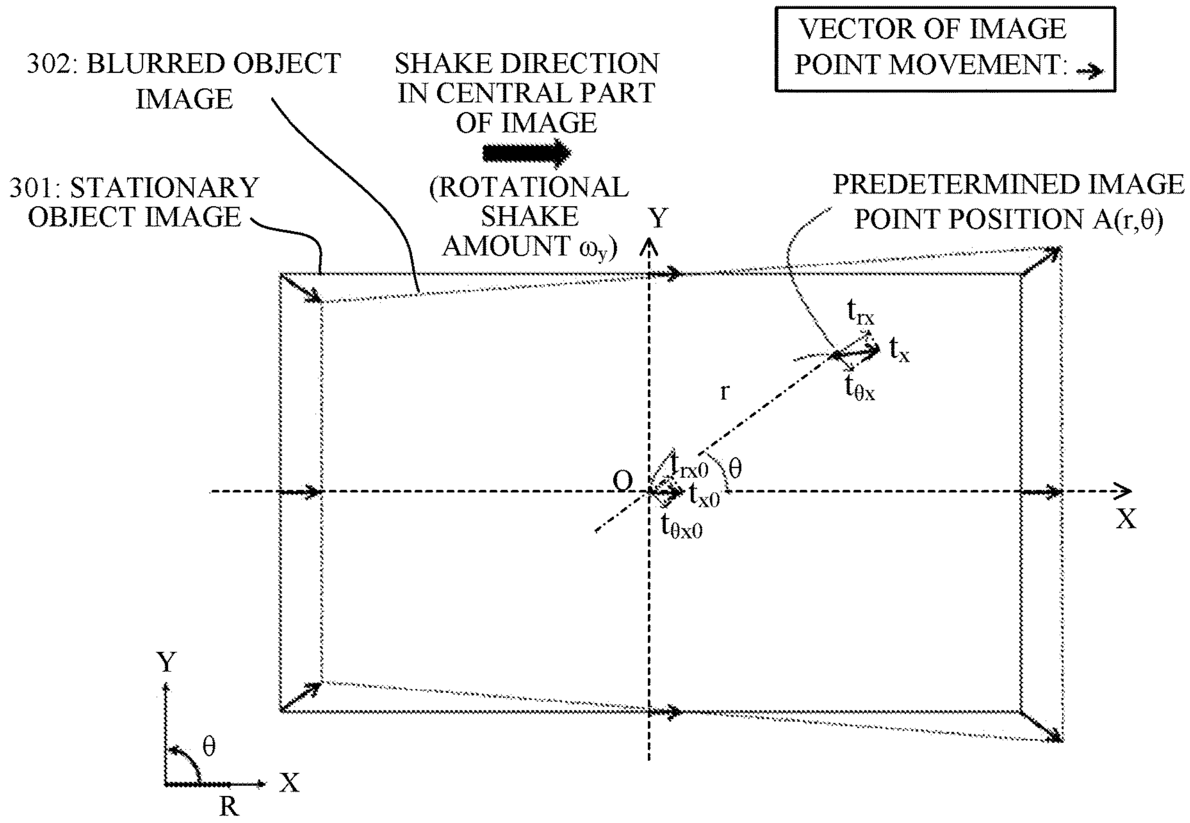
FIG. 4 is a diagram illustrating a comparison between an image point movement at a predetermined image point position and an image point movement in the central part of the image in a case where a rotational shake about a Y-axis occurs according to the first embodiment.

FIG. 4 is a diagram illustrating a comparison of an image point movement at a predetermined image point position A and an image point movement in the central part of the image in a case where a rotational shake about the Y-axis occurs and schematically illustrating a state in which a stationary object image 301 changes to an object image 302 which is distorted into a trapezoid due to image blur. With a wide-angle lens that optically reduces distortion using the central projection method, trapezoidal distortion such as distortion occurring in the object image 302 becomes large when a rotational shake occurs. Image blur occurs when each image point on the image pickup plane moves along a movement vector of the image point indicated by an arrow.

Hereinafter, a description will be given of an image point moving amount $t_{x0}$ in the +X-axis direction at a center position O of the image pickup plane, the center position O being in the central part of the image, and an image point moving amount $t_x$ at a predetermined image point position A in a case where a rotational shake amount $\omega_y$ about the Y-axis occurs.

The image point moving amount $t_{x0}$ is expressed by the following equation (1) where LS represents tilt-image shift sensitivity at an image height of 0.

$$t_{x0}=\omega_y \cdot LS \quad (1)$$

The image pickup plane on an X-Y plane is a polar coordinate system (R-θ coordinate system) where an origin is the center position O, and coordinates of the predetermined image point position A are (r, θ). That is, in this embodiment, the predetermined image point position A is a position on the image pickup plane represented by a plurality of parameters. The image height indicated by the horizontal axis of FIG. 3A corresponds to an image height $h_r$ in an R direction in the polar coordinate system of FIG. 4, and the image height indicated by the horizontal axis of FIG. 3B corresponds to an image height $h_\theta$ in a direction orthogonal to the R direction, i.e., a θ direction, in the polar coordinate system of FIG. 4. A tilt-image shift sensitivity coefficient $k_{LS\_r}$ ($h_r$) at the image height $h_r$ relative to tilt-image shift sensitivity LS is expressed by the following equation (2) where $LS_r$ ($h_r$) represents tilt-image shift sensitivity at the image height $h_r$.

$$k_{LS\_r}(h_r)=LS_r(h_r)/LS \quad (2)$$

A tilt-image shift sensitivity coefficient $k_{LS\_\theta}$ ($h_\theta$) at the image height $h_\theta$ relative to the tilt-image shift sensitivity LS is expressed by the following equation (3) where $LS_\theta$ ($h_\theta$) represents tilt-image shift sensitivity at the image height hθ.

$$k_{LS\_\theta}(h_\theta)=LS_\theta(h_\theta)/LS \quad (3)$$

An image point moving amount $t_{x0}$ is expressed by the following equations (4) to (6) where trio represents a parallel component parallel to a straight line OA and $t_{\theta x0}$ represents an orthogonal component orthogonal to the straight line OA.

$$t_{rx0}=t_{x0}\cdot\cos\theta=\omega_y\cdot LS\cdot\cos\theta \quad (4)$$

$$t_{\theta x0}=t_{x0}\cdot(-\sin\theta)=-\omega_y\cdot LS\cdot\sin\theta \quad (5)$$

$$|t_{x0}|=(t_{rx0}^2+t_{\theta x0}^2)^{1/2} \quad (6)$$

With respect to the sign of the parallel component $t_{rx0}$, a direction away from the center position O, i.e., the R direction, is positive, and with respect to the sign of the orthogonal component $t_{\theta x0}$, a direction counterclockwise around the center position O and orthogonal to the R direction, i.e., the θ direction, is positive. The R direction and the θ direction are also referred to as a meridional direction and a sagittal direction, respectively.

Next, a description will be given of an image point moving amount $t_x$ at the predetermined image point position A. With respect to the tilt-image shift sensitivity $LS_r$ ($h_r$), a parallel component $t_{rx}$ parallel to the straight line OA is affected by tilt-image shift sensitivity $LS_r$ (r) at an image height of r. An orthogonal component $t_{\theta x}$ orthogonal to the straight line OA is affected by the tilt-image shift sensitivity LS at the image height of 0. With respect to the tilt-image shift sensitivity $LS_\theta$ ($h_\theta$) in the direction orthogonal to the R direction, the parallel component $t_{rx}$ parallel to the straight line OA is affected by the tilt-image shift sensitivity LS at the image height of 0. An orthogonal component $t_{\theta x}$ orthogonal to the straight line OA is affected by the tilt-image shift sensitivity $LS_\theta$ (r) at the image height of r. Hence, an image point moving amount $t_x$ is expressed by the following equations (7) to (9) where the parallel component $t_{rx}$ and the orthogonal component $t_{\theta x}$ are used.

$$t_{rx}=k_{LS\_r}(r)\cdot k_{LS\_\theta}(0)\cdot t_{rx0}=k_{LS\_r}(r)\cdot \omega_y\cdot LS\cdot\cos\theta \quad (7)$$

$$t_{\theta x}=k_{LS\_r}(0)\cdot k_{LS\_\theta}(r)\cdot t_{\theta x0}=-k_{LS\_\theta}(r)\cdot \omega_y\cdot LS\cdot\sin\theta \quad (8)$$

$$|t_x|(t_{rx}^2+t_{\theta x}^2)^{1/2} \quad (9)$$

As described above, the image point moving amount $t_x$ is calculated, the image point moving amount $t_x$ being at the predetermined image point position A in the case where the rotational shake amount $\omega_y$ about the Y-axis occurs. Similarly, an image point moving amount $t_y$ at the predetermined image point position A in the polar coordinate system in a case where a rotational shake amount $\omega_x$ about the X-axis occurs is expressed by the following equations (10) to (12) where $t_{ry}$ represents a parallel component parallel to the straight line OA and $t_{\theta y}$ represents an orthogonal component orthogonal to the straight line OA.

$$t_{ry}=k_{LS\_r}(r)\cdot k_{LS\_\theta}(0)\cdot t_{ry0}=k_{LS\_r}(r)\cdot \omega_x\cdot LS\cdot\sin\theta \quad (10)$$

$$t_{\theta y}=k_{LS\_r}(0)\cdot k_{LS\_\theta}(r)\cdot t_{\theta y0}=k_{LS\_\theta}(r)\cdot \omega_x\cdot LS\cdot\cos\theta \quad (11)$$

$$|t_y|=(t_{ry}^2+t_{\theta y}^2)^{1/2} \quad (12)$$

Thus, an image point moving amount t at the predetermined image point position A in a case where a rotational shake amount ($\omega_x$, $\omega_y$) occurs about predetermined rotation axes that are orthogonal to the optical axis and intersect with the optical axis on the image pickup plane is expressed by the following equations (13) to (15) where $t_r$ represents a parallel component parallel to the straight line OA and to represents an orthogonal component orthogonal to the straight line OA.

$$t_r=t_{rx}+t_{ry}=k_{LS\_r}(r)\cdot LS(\omega_y\cdot\cos\theta+\omega_x\cdot\sin\theta)=K_{LS1}(r,\theta)\cdot\omega_y+K_{LS2}(r,\theta)\cdot\omega_x \quad (13)$$

$$t_\theta=t_{\theta x}+t_{\theta y}=k_{LS\_\theta}(r)\cdot LS(-\omega_y\cdot\sin\theta+\omega_x\cdot\cos\theta)=K_{LS3}(r,\theta)\cdot\omega_y+K_{LS4}(r,\theta)\cdot\omega_x \quad (14)$$

$$|t|=(t_r^2+t_0^2)^{1/2} \quad (15)$$

The coefficients ($K_{LS1}$, $K_{LS2}$, $K_{LS3}$, $K_{LS4}$) in the equations (13) and (14) are as follows.

$$K_{LS1}(r,\theta)=k_{LS\_r}(r)\cdot LS\cdot\cos\theta$$

$$K_{LS2}(r,\theta)=k_{Ls\_r}(r)\cdot LS\cdot\sin\theta$$

$$K_{LS3}(r,\theta)=-k_{LS\_\theta}(r)\cdot LS\cdot\sin\theta$$

$$K_{LS4}(r,\theta)=k_{LS\_\theta}(r)\cdot LS\cdot\cos\theta$$

As expressed by the equations (13) to (15), the image point moving amount t includes the image stabilization coefficient information ($K_{LS1}$, $K_{LS2}$, $K_{LS3}$, $K_{LS4}$) and the rotational shake amount ($\omega_x$, $\omega_y$), the image stabilization coefficient information ($K_{LS1}$, $K_{LS2}$, $K_{LS3}$, $K_{LS4}$) including the tilt-image shift sensitivity and the position information (r, θ) on the image point position. In this embodiment, the lens memory 106 stores in advance an image stabilization coefficient table as information on the tilt-image shift sensitivity, the image stabilization coefficient table including the image stabilization coefficient information ($K_{LS1}$, $K_{LS2}$, $K_{LS3}$, $K_{LS4}$) associated with the image point positions indicated in FIGS. 5A and 5B in a matrix format. As a result, it is possible to easily acquire the image point moving amount t at the predetermined image point position A in a case where the rotational shake amount ($\omega_x$, $\omega_y$) occurs. An interval between the image point positions in the image stabilization coefficient table is set as appropriate. The image stabilization coefficient table may be managed not by using the polar coordinate system but by using an orthogonal coordinate system.

In order to reduce information to be stored in the lens memory 106, the information on the tilt-image shift sensitivity may be tilt-image shift sensitivity for each image height or may be information with which the image point moving amount t can be acquired by using position information on the predetermined image point position on which image stabilization is to be performed. Further, the position information on the image point position may be information on the polar coordinate system or may be information on a predetermined coordinate system such as an orthogonal coordinate system. The information on the tilt-image shift sensitivity may be acquired by using a focal length depending on specifications of the image pickup optical system 101 or an image height expression based on a projection method.

Acquisition of Information on Decentering-Image Shift Sensitivity

Figure 6A:
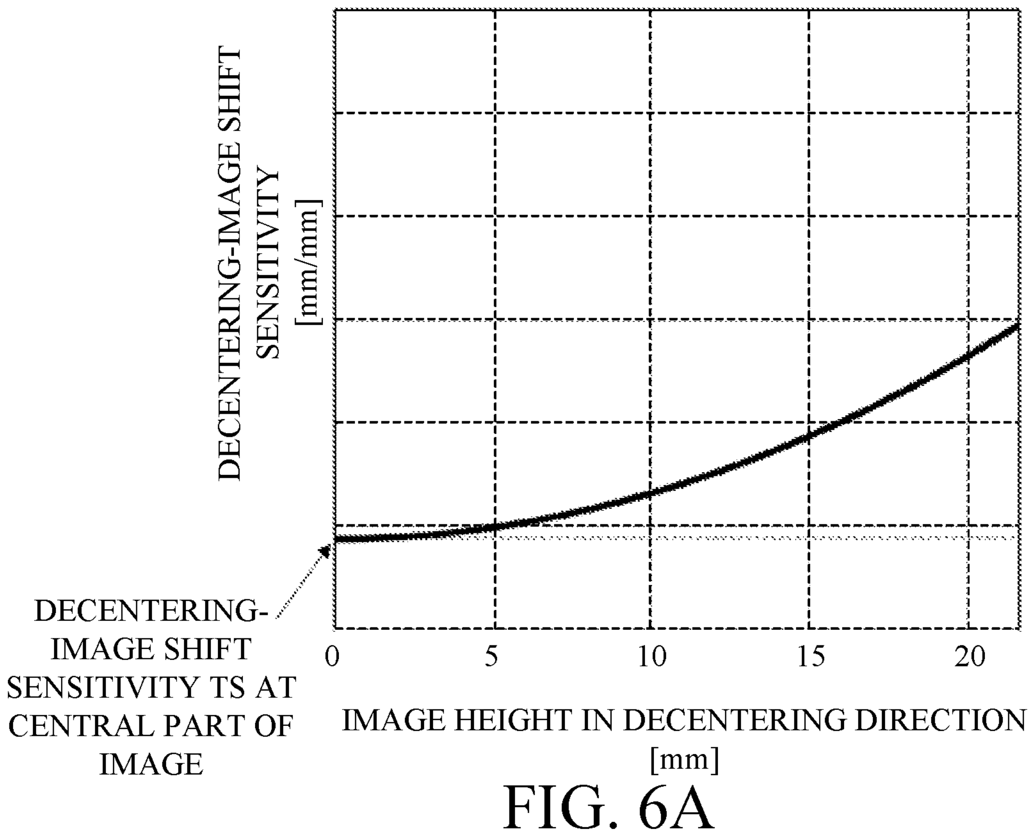
FIG. 6A illustrates a relationship between an image height and a decentering-image shift sensitivity in the central part of the image, the image height being in a decentering direction in a case where the image stabilizing optical system according to the first embodiment is decentered.
Figure 6B:
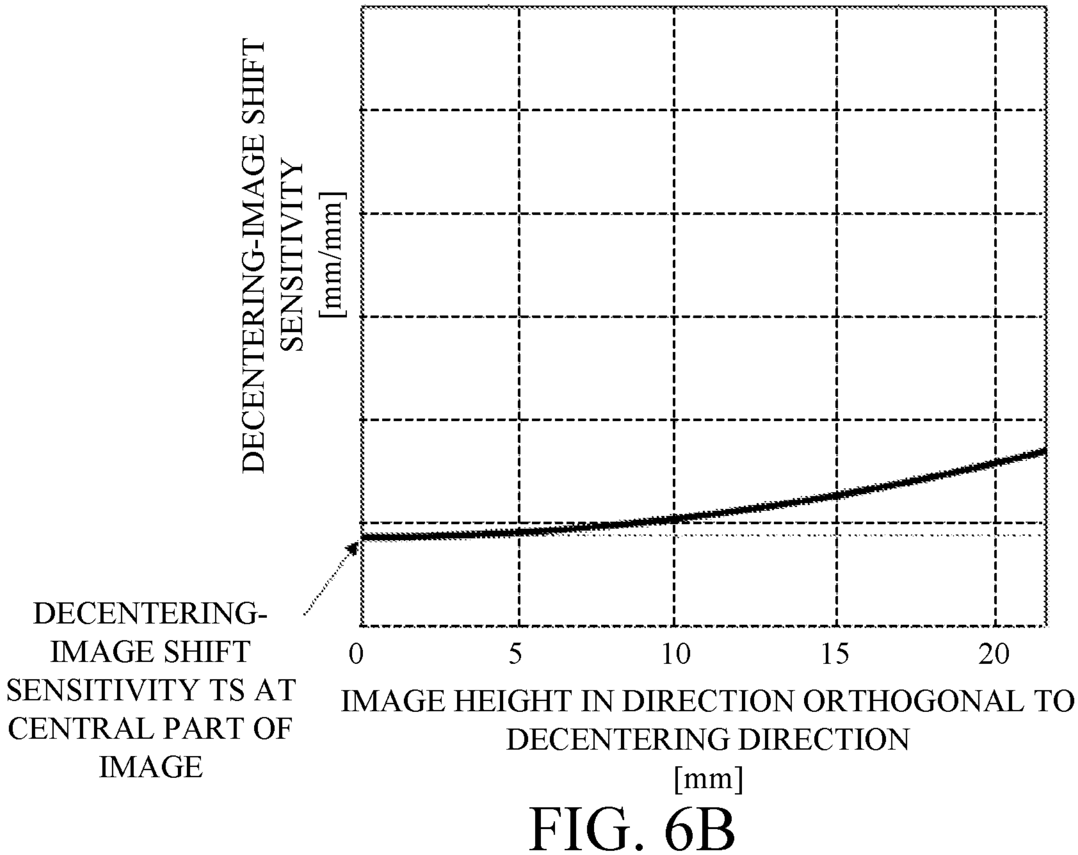
FIG. 6B illustrates a relationship between an image height and decentering-image shift sensitivity in the central part of the image, the image height being in a direction orthogonal to the decentering direction in the case where the image stabilizing optical system according to the first embodiment is decentered.

In this embodiment, the decentering-image shift sensitivity is image point moving amounts in a decentering direction and in a direction orthogonal to the decentering direction relative to a decentering amount of the image stabilizing optical system 1014 with respect to the optical axis of the image pickup optical system 101. FIG. 6A indicates a relationship between an image height and decentering-image shift sensitivity in a case where the image stabilizing optical system 1014 of this embodiment is decentered, the image height being in the decentering direction and in a central part of an image. FIG. 6B indicates a relationship between an image height and decentering-image shift sensitivity in the case where the image stabilizing optical system 1014 in this embodiment is decentered, the image height being in the direction orthogonal to the decentering direction and in the central part of the image. As indicated in FIGS. 6A and 6B, the higher the image height, the larger the image point moving amount in the case where the image stabilizing optical system 1014 is decentered, the image stabilizing optical system 1014 being designed to reduce eccentric distortion. In this embodiment, a proper image stabilizing driving amount for the image blur at the predetermined image point position can be acquired by using the decentering-image shift sensitivity acquired by using a design value of the image pickup optical system 101. The decentering-image shift sensitivity of this embodiment is a value acquired by dividing, by 0.1 mm, the image point moving amount in a case where the image stabilizing optical system 1014 is decentered by 0.1 mm, but the decentering amount of the image stabilizing optical system 1014 is not limited to 0.1 mm and may be properly set.

Figure 7:
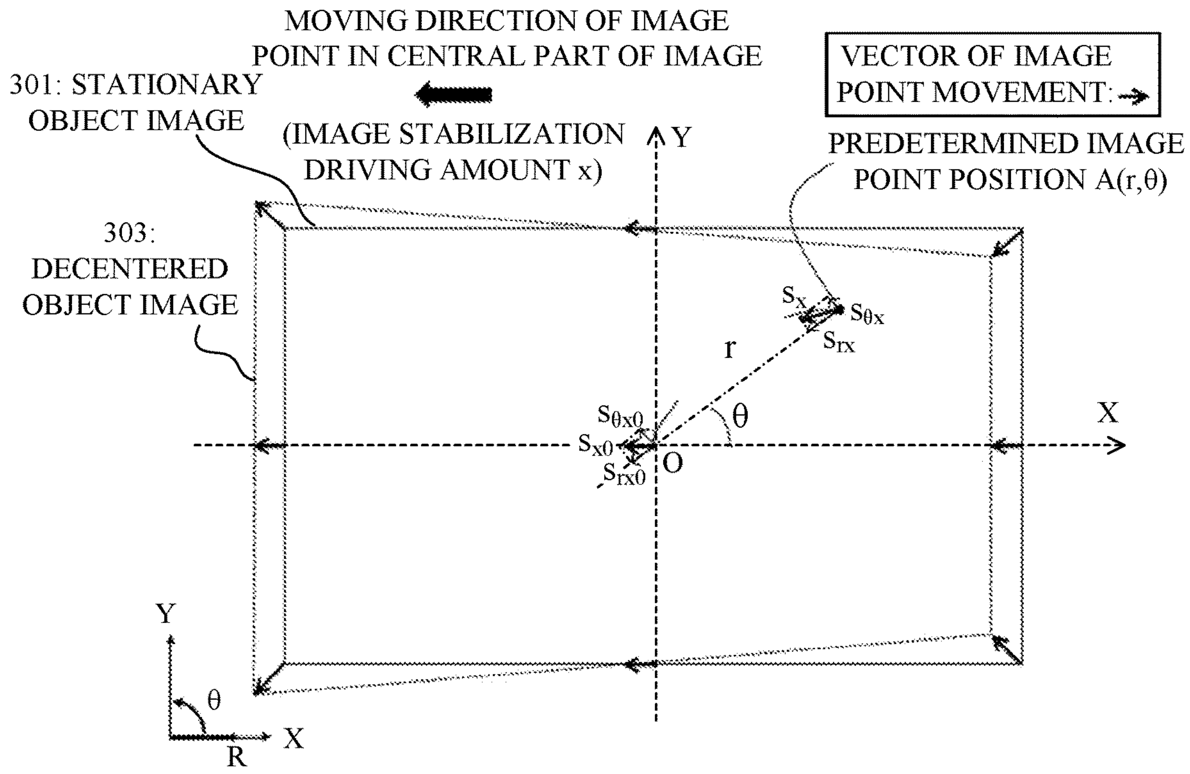
FIG. 7 is a diagram illustrating a comparison between an image point movement at the predetermined image point position and an image point movement at the central part of the image in the case where the image stabilizing optical system according to the first embodiment is decentered.

FIG. 7 is a diagram illustrating a comparison between an image point movement at the predetermined image point position A and an image point movement at the central position of the image in a case where the image stabilizing optical system 1014 is decentered. FIG. 7 schematically illustrates a state in which the stationary object image 301 changes to an object image 303 which is distorted into a trapezoid when each image point on the object image 301 moves along with a movement vector of the image point indicated by an arrow.

Hereinafter, a description will be given of an image point moving amount $s_{x0}$ at the center position O of the image pickup plane and an image point moving amount $s_x$ at the predetermined image point position A in a case where the image stabilizing optical system 1014 is decentered by a decentering amount x in the X-axis direction.

The image point moving amount $s_x$ is expressed by the following equation (16) where TS represents decentering-image shift sensitivity at the image height of 0.

$$s_{x0}=x\cdot TS \tag{16}$$

The image pickup plane on the X-Y plane is the polar coordinate system (R-θ coordinate system) where the origin is the center position O, and the coordinates of the predetermined image point position A are (r, θ). The image height indicated by the horizontal axis of FIG. 6A corresponds to an image height $h_r'$ in the R direction in the polar coordinate system of FIG. 7, and the image height indicated by the horizontal axis of FIG. 6B corresponds to an image height $h_\theta'$ in the direction orthogonal to the R direction, i.e., the θ direction, in the polar coordinate system of FIG. 7. A decentering-image shift sensitivity coefficient $k_{TS\_r}$ ($h_r'$) at the image height $h_r$ relative to decentering-image shift sensitivity TS is expressed by the following equation (17) where $TS_r$ ($h_r'$) represents decentering-image shift sensitivity at the image height $h_r'$.

$$k_{TS\_r}(h_r')=TS_r(h_r')/TS \tag{17}$$

A decentering-image shift sensitivity coefficient $k_{TS\_\theta}$ ($h_\theta'$) at the image height $h_\theta'$ relative to the decentering-image shift sensitivity TS is expressed by the following equation (18) where $TS_\theta$ ($h_\theta'$) represents decentering-image shift sensitivity at the image height $h^{\theta\prime}$.

$$k_{TS\_\theta}(h_\theta')=TS_\theta(h_\theta')/TS \tag{18}$$

An image point moving amount $s_{x0}$ is expressed by the following equations (19) to (21) where $s_{rx0}$ represents a parallel component parallel to the straight line OA and $s_{\theta x0}$ represents an orthogonal component orthogonal to the straight line OA.

$$s_{rx0}=s_{x0}\cdot\cos\theta=x\cdot TS\cdot\cos\theta \tag{19}$$

$$s_{\theta x0}=s_{x0}\cdot(-\sin\theta)=-x\cdot TS\cdot\sin\theta \tag{20}$$

$$|s_{x0}|=(s_{rx0}^2+s_{\theta x0}^2)^{1/2} \tag{21}$$

With respect to the sign of the parallel component $s_{rx0}$, a direction away from the center position O, i.e., the R direction, is positive, and with respect to the sign of the orthogonal component $s_{\theta x0}$, the direction counterclockwise around the center position O and orthogonal to the R direction, i.e., the θ direction, is positive.

Next, a description will be given of an image point moving amount $s_x$ at the predetermined image point position A. With respect to the decentering-image shift sensitivity $TS_r$ ($h_r'$) in the R direction, the parallel component $s_{rx}$ parallel to the straight line OA is affected by the decentering-image shift sensitivity $TS_r$ (r) at the image height of r. The orthogonal component sex orthogonal to the straight line OA is affected by the decentering-image shift sensitivity TS at the image height of 0. With respect to the decentering-image shift sensitivity $TS_\theta$ ($h_\theta'$) in the direction orthogonal to the R direction, the parallel component $s_{rx}$ parallel to the straight line OA is affected by the decentering-image shift sensitivity TS at the image height of 0. The orthogonal component sex orthogonal to the straight line OA is affected by the decentering-image shift sensitivity $TS_\theta$ (r) at the image height of r. Hence, the image point moving amount $s_x$ is expressed by the following equations (22) to (24) where the parallel component $s_{rx}$ and the orthogonal component sex are used.

$$s_{rx}=k_{TS\_r}(r)\cdot k_{TS\_\theta}(0)\cdot s_{sx0}=k_{TS\_r}(r)\cdot x\cdot TS\cdot\cos\theta \tag{22}$$

$$s_{\theta x}=k_{TS\_r}(0)\cdot k_{TS\_\theta}(r)\cdot s_{\theta x0}=-k_{TS\_\theta}(r)\cdot x\cdot TS\cdot\sin\theta \tag{23}$$

$$|s_x|=(s_{rx}^2+s_{\theta x}^2)^{1/2} \tag{24}$$

As described above, the image point moving amount $s_x$ is calculated, the image point moving amount $s_x$ being at the predetermined image point position A in a case where the image stabilizing optical system 1014 is decentered by a decentering amount x in the X-axis direction. Similarly, an image point moving amount $s_y$ at the predetermined image point position A in the polar coordinate system in a case where the image stabilizing optical system 1014 is decentered in the Y-axis direction by a decentering amount y is expressed by the following equations (25) to (27) where $s_{ry}$ represents a parallel component parallel to the straight line OA and $s_{\theta y}$ represents an orthogonal component orthogonal to the straight line OA.

$$s_{ry}=k_{TS\_r}(r)\cdot k_{TS\_\theta}(0)\cdot s_{ry0}=k_{TS\_r}(r)\cdot y\cdot TS\cdot\sin\theta \tag{25}$$

$$s_{\theta y}=k_{TS\_r}(0)\cdot k_{TS\_\theta}(r)\cdot s_{fy0}=k_{TS\_\theta}(r)\cdot y\cdot TS\cdot\cos\theta \tag{26}$$

$$|s_y|=(S_{ry}^2+S_{\theta y}^2)^{1/2} \tag{27}$$

Thus, an image point moving amount s at the predetermined image point position A in a case where the image stabilizing optical system 1014 is decentered from the optical axis is expressed by the following equations (28) to (30) where $s_r$ represents a parallel component parallel to the straight line OA and se represents an orthogonal component orthogonal to the straight line OA.

$$s_r=s_{rx}+t_{ry}=k_{TS\_r}(r)\cdot TS(x\cdot\cos\theta+y\cdot\sin\theta)=K_{TS1}(r,\theta)\cdot x+K_{TS2}(r,\theta)\cdot y \tag{28}$$

$$s_\theta=s_{\theta x}+s_{\theta y}=k_{TS\_\theta}(r)\cdot TS(-x\cdot\sin\theta+y\cdot\cos\theta)=K_{TS3}(r,\theta)\cdot x+K_{TS4}(r,\theta)\cdot y \tag{29}$$

$$|s|=(s_r^2+s_\theta^2)^{1/2} \tag{30}$$

The coefficients ($K_{TS1}$, $K_{TS2}$, $K_{TS3}$, $K_{TS4}$) in the equations (28) and (29) are as follows.

$$K_{TS1}(r,\theta)=k_{TS\_r}(r)\cdot TS\cdot\cos\theta$$

$$K_{TS2}(r,\theta)=k_{TS\_r}(r)\cdot TS\cdot\sin\theta$$

$$K_{TS3}(r,\theta)=-k_{TS\_\theta}(r)\cdot TS\cdot\sin\theta$$

$$K_{TS4}(r,\theta)=k_{TS\_\theta}(r)\cdot TS\cdot\cos\theta$$

As expressed by equations (28) to (30), the image point moving amount s includes the image stabilization coefficient information ($K_{TS1}$, $K_{TS2}$, $K_{TS3}$, $K_{TS4}$) and a decentering amount (x, y), the image stabilization coefficient information ($K_{TS1}$, $K_{TS2}$, $K_{TS3}$, $K_{TS4}$) including the decentering-image shift sensitivity and the position information (r, θ) on the image point position. In this embodiment, the lens memory 106 stores in advance an image stabilization coefficient table as information on the decentering-image shift sensitivity, the image stabilization coefficient table including the image stabilization coefficient information ($K_{TS1}$, $K_{TS2}$, $K_{TS3}$, $K_{TS4}$) associated with image point positions in a matrix format. As a result, it is possible to easily acquire the image point moving amount s at the predetermined image point position A in the case where the image stabilizing optical system 1014 is decentered. An interval between the image point positions in the image stabilization coefficient table is set as appropriate. The image stabilization coefficient table may be managed not by using the polar coordinate system but by using an orthogonal coordinate system.

In order to reduce information to be stored in the lens memory 106, the information on the decentering-image shift sensitivity may be decentering-image shift sensitivity for each image height or may be information with which the image point moving amount s can be acquired by using position information on the predetermined image point position on which image stabilization is to be performed. Further, the position information on the image point position may be information on the polar coordinate system or may be information on a predetermined coordinate system such as an orthogonal coordinate system.

Setting of Information on Image Stabilizing Position on Image Pickup Plane

In this embodiment, a setting mode of the image pickup system 1 can be set to an image center image stabilization mode that sets, to the center of the image pickup plane, the predetermined image point position on which image stabilization is to be performed (image stabilizing position) and to an image stabilizing position setting mode that can set the image stabilizing position to the predetermined image point position other than the center of the image pickup plane. When the image stabilizing position setting mode is set, the image stabilizing position can be set via the display-operation unit 203. A position that can be set via the display-operation unit 203 may be linked to an image point position on which autofocus or auto-photometry is performed. The image point position on which autofocus is performed may be a position automatically detected by pupil detection, person detection, or the like. The information on the image stabilizing position (r, θ) on the image pickup plane is transmitted to the camera microcomputer 202, and the image stabilization coefficient information to be used is selected from the image stabilization coefficient table.

Motion Detection Signal

The gyro sensor 205 detects the angular velocities about a plurality of rotation axes of the image pickup system 1 and outputs information on the rotational shake amount as the motion detection signal. In this embodiment, the gyro sensor 205 detects the angular velocities around the X-axis and around the Y-axis, and outputs information on the rotational shake amount ($\omega_x$, $\omega_y$). The acceleration sensor 206 detects acceleration in directions of a plurality of axes of the image pickup system 1 and outputs information on a translational shake amount as the motion detection signal. In this embodiment, the acceleration sensor 206 detects acceleration in the X-axis direction and in the Y-axis direction and outputs information on a translational shake amount ($a_x$, $a_y$). The gyro sensor 205 may include a plurality of sensors each of which detects an angular velocity around one axis. Similarly, the acceleration sensor 206 may include a plurality of sensors each of which detects acceleration in one direction.

Acquisition of Image Stabilizing Driving Amount

The camera microcomputer 202 acquires the image stabilizing driving amount by using the information on the tilt-image shift sensitivity, the information on the decentering-image shift sensitivity, the information on the image stabilizing position, and the motion detection signals. For example, when the image blur at the predetermined image point position A is to be reduced by OIS, the image stabilizing optical system 1014 may be moved so that the image point moving amount t caused by a rotational shake and the image point moving amount s caused by decentering the image stabilizing optical system 1014 cancel each other out. Specifically, an image point moving amount ($t_r$, $t_\theta$), which is acquired by decomposing the image point moving amount t caused by the rotational shake into two orthogonal components in the polar coordinate system, and the image point moving amount ($s_r$, $s_\theta$), which is acquired by decomposing the image point moving amount s caused by decentering the image stabilizing optical system 1014 into two orthogonal components in the polar coordinate system, may cancel each other out, i.e., $s_r=-t_r$ and $s_\theta=-t_\theta$ may be satisfied. That is, the following equations (31) and (32) may be satisfied.

$$K_{TS1}(r,\theta)\cdot x+K_{TS2}(r,\theta)\cdot y=-K_{LS1}(r,\theta)\cdot\omega_y-K_{LS2}(r,\theta)\cdot\omega_x \quad (31)$$

$$K_{TS3}(r,\theta)\cdot x+K_{TS4}(r,\theta)\cdot y=-K_{LS3}(r,\theta)\cdot\omega_y-K_{LS4}(r,\theta)\cdot\omega_x \quad (32)$$

The camera microcomputer 202 can acquire the image stabilizing driving amount (x, y) of the image stabilizing optical system 1014 from the image point moving amount (t, s) by using the equations (31) and (32).

Figure 8:
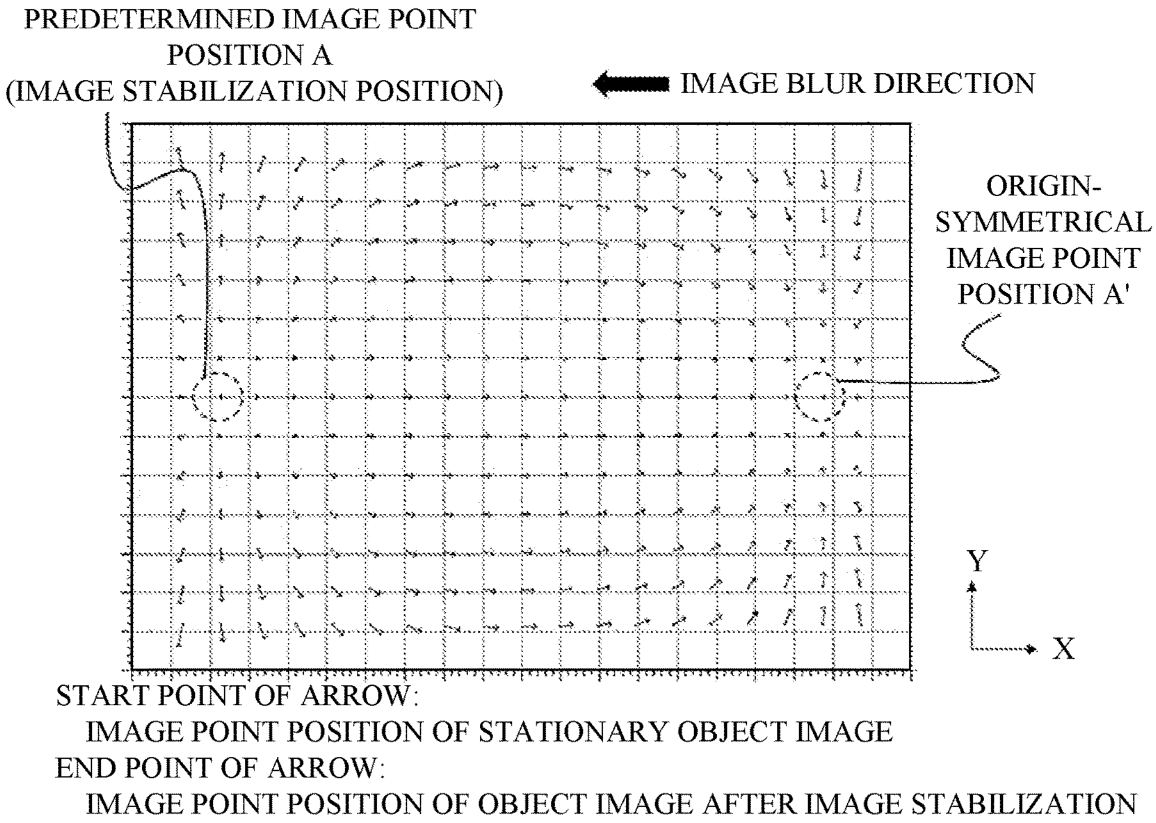
FIG. 8 is a diagram illustrating arrows each indicating a ratio and a direction of an image point moving amount of a blur residual remained at an image point after image blur at the predetermined image point position is reduced by OIS according to the first embodiment.

FIG. 8 is a diagram illustrating arrows each indicating a ratio and a direction of an image point moving amount of a blur residual remained at each image point after the image blur at the predetermined image point position A is reduced by OIS according to this embodiment. As illustrated in FIG. 8, the image blur at the set predetermined image point position A is reduced well while the image blur at the central part of the image is remained. An image point movement of the same motion vector as that at the image point position A occurs at an image point position A' that is origin-symmetrical to the predetermined image point position A where the central part of the image is regarded as the origin, and thus image blur at the image point position A' is also reduced. Hence, by properly setting the image stabilizing position at the predetermined position, which is not on the optical axis, within a range such that the image blur at the central part of the image is inconspicuous, the image blur can be reduced while a difference in image blur amounts in the entire image is reduced.

Since the equations (31) and (32) are linear simultaneous equations relating to the image stabilizing driving amount (x, y) of the image stabilizing optical system 1014, the image stabilizing driving amount (x, y) of the image stabilizing optical system 1014 can be expressed by the following equations (33) and (34).

$$x=K_1(r,\theta)\omega_x+K_2(r,\theta)\omega_y \quad (33)$$

$$y=K_3(r,\theta)\omega_x+K_4(r,\theta)\omega_y \quad (34)$$

The coefficients ($K_1$, $K_2$, $K_3$, $K_4$) in the equations (33) and (34) are as follows.

$$K_1(r,\theta)=(-K_{LS2}(r,\theta)\cdot K_{TS4}(r,\theta)+K_{LS4}(r,\theta)\cdot K_{TS2}(r,\theta))/(K_{TS1}(r,\theta)\cdot K_{TS4}(r,\theta)-K_{TS2}(r,\theta)\cdot K_{TS3}(r,\theta))$$

$$K_2(r,\theta)=(-K_{LS1}(r,\theta)\cdot K_{TS4}(r,\theta)+K_{LS3}(r,\theta)\cdot K_{TS2}(r,\theta))/(K_{TS1}(r,\theta)\cdot K_{TS4}(r,\theta)-K_{TS2}(r,\theta)\cdot K_{TS3}(r,\theta))$$

$$K_3(r,\theta)=(-K_{LS2}(r,\theta)\cdot K_{TS3}(r,\theta)+K_{LS4}(r,\theta)\cdot K_{TS1}(r,\theta))/(K_{TS2}(r,\theta)\cdot K_{TS3}(r,\theta)-K_{TS1}(r,\theta)\cdot K_{TS4}(r,\theta))$$

$$K_4(r,\theta)=(-K_{LS1}(r,\theta)\cdot K_{TS3}(r,\theta)+K_{LS3}(r,\theta)\cdot K_{TS1}(r,\theta))/(K_{TS2}(r,\theta)\cdot K_{TS3}(r,\theta)-K_{TS1}(r,\theta)\cdot K_{TS4}(r,\theta))$$

As expressed by the equations (33) and (34), the image stabilizing driving amount (x, y) includes the image stabilization coefficient information ($K_1$, $K_2$, $K_3$, $K_4$) and the rotational shake amount ($\omega_x$, $\omega_y$). The lens memory 106 may store an image stabilization coefficient table including the image stabilization coefficient information ($K_1$, $K_2$, $K_3$, $K_4$) in a matrix format. In this case, it is possible to further easily acquire the image stabilizing driving amount (x, y) for the predetermined image point position Ain the case where the rotational shake amount ($\omega_x$, $\omega_y$) occurs.

With respect to image blur caused by a translational shake, the image stabilizing driving amount may be acquired by using information on the translational shake amount output from the acceleration sensor 206. The image stabilizing driving amount for the translational shake may be acquired by converting the translational shake amount ($a_x$, $a_y$) into the rotational shake amount ($\omega_x$, $\omega_y$) by using in-focus object distance information. In a case where the rotational shake and the translational shake simultaneously occur, the image stabilizing driving amount may be acquired by adding the image stabilizing driving amount for the translational shake and the image stabilizing driving amount for the rotational shake. The image stabilizing driving amount for the translational shake at the predetermined image point position may be acquired by multiplying the converted rotational shake amount by the image stabilization coefficient included in the information on the tilt-image shift sensitivity.

The tilt-image shift sensitivity and decentering-image shift sensitivity vary depending on a distance to an object on which the image pickup optical system 101 is in focus (in-focus position) and depending on a focal length (image pickup angle of view). In this embodiment, the lens memory 106 stores a plurality of different image stabilization coefficient tables for in-focus positions which the focusing optical system 1011 determines and for focal lengths which the zooming optical system 1012 determines. As a result, it is possible to reduce well the image blur at the predetermined image point position even during zooming and focusing.

The lens apparatus 100 may be detachably attachable to the image pickup apparatus 200. In this case, information on the tilt-image shift sensitivity and information on the decentering-image shift sensitivity proper for each lens apparatus 100 may be used. As a result, even when a different lens apparatus 100 is attached to the image pickup apparatus 200 and is used, the image blur at the predetermined image point position can be reduced well.

Second Embodiment

In this embodiment, a description will be given of a method of reducing image blur by both OIS and IIS. In this embodiment, only a description of points different from the first embodiment will be given. In this embodiment, an outline configuration of an image pickup system 1 and an acquisition method of an image stabilizing driving amount of an image stabilizing optical system 1014 are the same as those according to the first embodiment, and thus the description thereof will be omitted.

Figure 9:
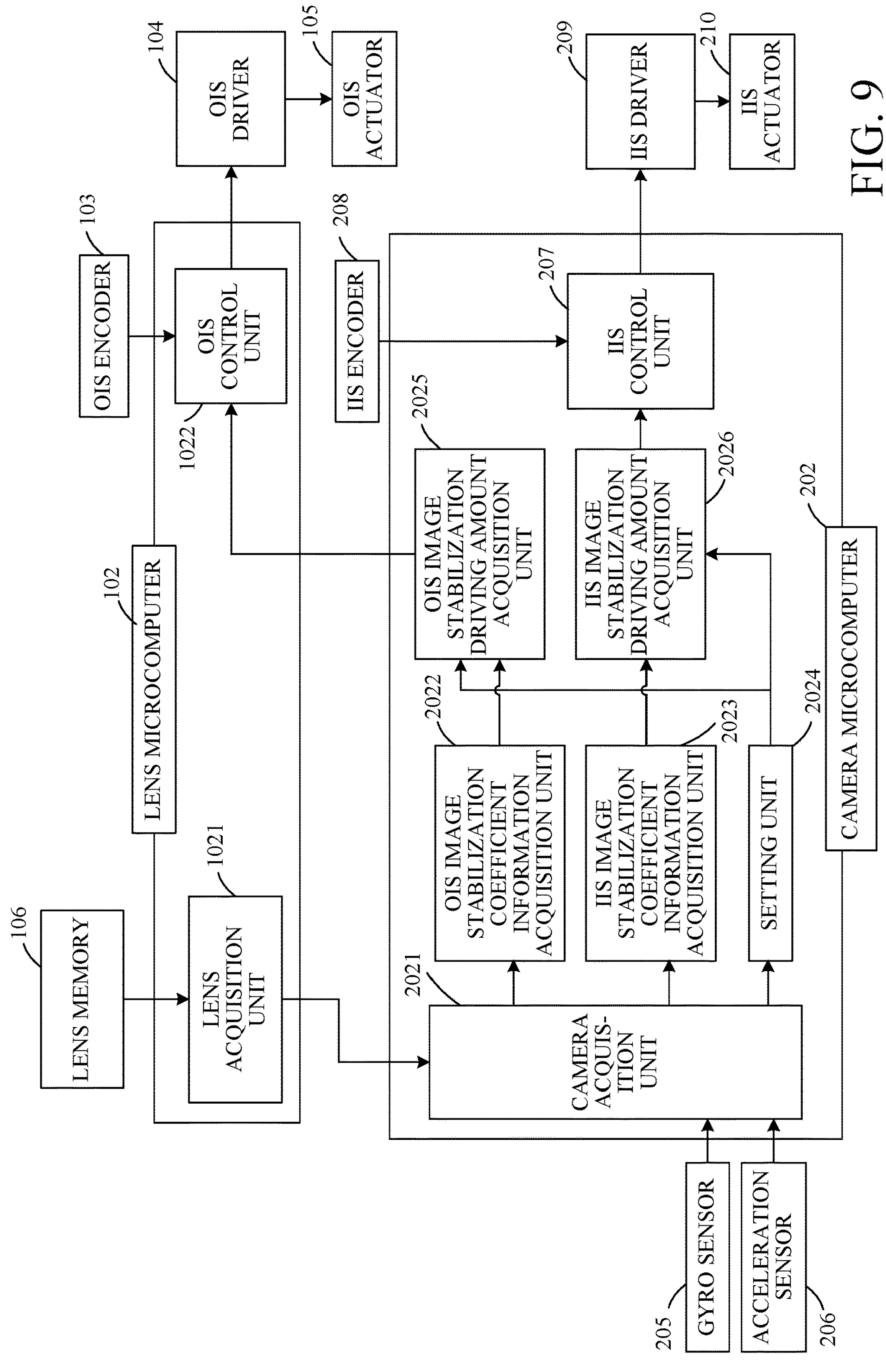
FIG. 9 is a configuration diagram illustrating a lens microcomputer and a camera microcomputer according to a second embodiment.

FIG. 9 is a configuration diagram illustrating a lens microcomputer 102 and a camera microcomputer 202 according to this embodiment. The lens microcomputer 102 includes a lens acquisition unit 1021 and an OIS control unit 1022. The camera microcomputer 202 includes a camera acquisition unit 2021, an OIS image stabilization coefficient information acquisition unit (first acquisition unit) 2022, an IIS image stabilization coefficient information acquisition unit (third acquisition unit) 2023, and a setting unit 2024. The camera microcomputer 202 further includes an OIS image stabilizing driving amount acquisition unit (second acquisition unit) 2025, an IIS image stabilizing driving amount acquisition unit (fourth acquisition means) 2026, and an IIS control unit 207. In this embodiment, the camera microcomputer 202 includes the OIS image stabilization coefficient information acquisition unit 2022, the IIS image stabilization coefficient information acquisition unit 2023, the OIS image stabilizing driving amount acquisition unit 2025, and the IIS image stabilizing driving amount acquisition unit 2026, but the present invention is not limited to this and the lens microcomputer 102 may include these. Alternatively, the lens microcomputer 102 may include the OIS image stabilization coefficient information acquisition unit 2022 and the OIS image stabilizing driving amount acquisition unit 2025, and the camera microcomputer 202 may include the IIS image stabilization coefficient information acquisition unit 2023 and the IIS image stabilizing driving amount acquisition unit 2026. Alternatively, the camera microcomputer 202 may include the OIS image stabilization coefficient information acquisition unit 2022 and the OIS image stabilizing driving amount acquisition unit 2025, and the lens microcomputer 102 may include the IIS image stabilization coefficient information acquisition unit 2023 and the IIS image stabilizing driving amount acquisition unit 2026.

In this embodiment, since the image blur at the predetermined image point position A is reduced by OIS and IIS, a higher image stabilization effect can be realized than in a case where the image blur is reduced only by OIS. When image blur at a predetermined image point position A is reduced by IIS, an image sensor 201 may be moved so that an image point moving amount t represented by the equations (13) to (15) described in the first embodiment is cancelled. An image stabilizing driving amount x' in the X-axis direction and an image stabilizing driving amount y' in the Y-axis direction of the IIS actuator 210 are expressed by the following equations (35) and (36).

$$\begin{aligned} x' &= t_r\cdot\cos\theta - t_\theta\cdot\sin\theta \\ &= \omega_y\{k_{LS\_\theta}(r)\cdot\sin^2\theta + k_{LS\_r}(r)\cdot\cos^2\theta\}LS + \omega_x\{k_{LS\_r}(r) - k_{LS\_\theta}(r)\}LS\cdot\sin\theta\cdot\cos\theta \\ &= K_1'(r,\theta)\cdot\omega_y + K_2'(r,\theta)\cdot\omega_x \end{aligned} \tag{35}$$

-continued $$\begin{aligned} y' &= t_r \cdot \sin\theta + t_\theta \cdot \cos\theta \\ &= \omega_y\{k_{LS\_r}(r) - k_{LS\_\theta}(r)\}LS \cdot \sin\theta \cdot \cos\theta + \omega_x\{k_{LS\_r}(r) \cdot \sin^2\theta + k_{LS\_\theta}(r) \cdot \cos^2\theta\}LS \\ &= K_3'(r, \theta) \cdot \omega_y + K_4'(r, \theta) \cdot \omega_x \end{aligned} \tag{36}$$

The coefficients ($K_1$, $K_2$, $K_3$, $K_4$) in the equations (35) and (36) are as follows.

$$K'_1(r,\theta)=\{k_{LS\_\theta}(r)\cdot\sin^2\theta+k_{LS\_r}(r)\cdot\cos^2\theta\}LS$$

$$K'_2(r,\theta)=\{k_{LS\_r}(r)-k_{LS\_\theta}(r)\}LS\cdot\sin\theta\cdot\cos\theta$$

$$K'_3(r,\theta)=\{k_{LS\_r}(r)-k_{LS\_\theta}(r)\}LS\cdot\sin\theta\cdot\cos\theta$$

$$K'_4(r,\theta)=\{k_{LS\_r}(r)\cdot\sin^2\theta+k_{LS\_\theta}(r)\cdot\cos^2\theta\}LS$$

As expressed by the equations (35) and (36), the image stabilizing driving amount (x', y') includes the image stabilization coefficient information ($K'_1$, $K'_2$, $K'_3$, $K'_4$) and the rotational shake amount ($\omega_x$, $\omega_y$). The lens memory 106 may store, as information on the tilt-image shift sensitivity, an image stabilization coefficient table that includes the image stabilization coefficient information ($K'_1$, $K'_2$, $K'_3$, $K'_4$) in a matrix format. Using $K'_1$ or the like instead of the above-described image stabilization coefficient information ($K_1$, $K_2$, $K_3$, $K_4$) makes it possible to more easily acquire the image stabilizing driving amount (x', y') for the predetermined image point position A in a case where the rotational shake amount ($\omega_x$, $\omega_y$) occurs.

Figure 10A:
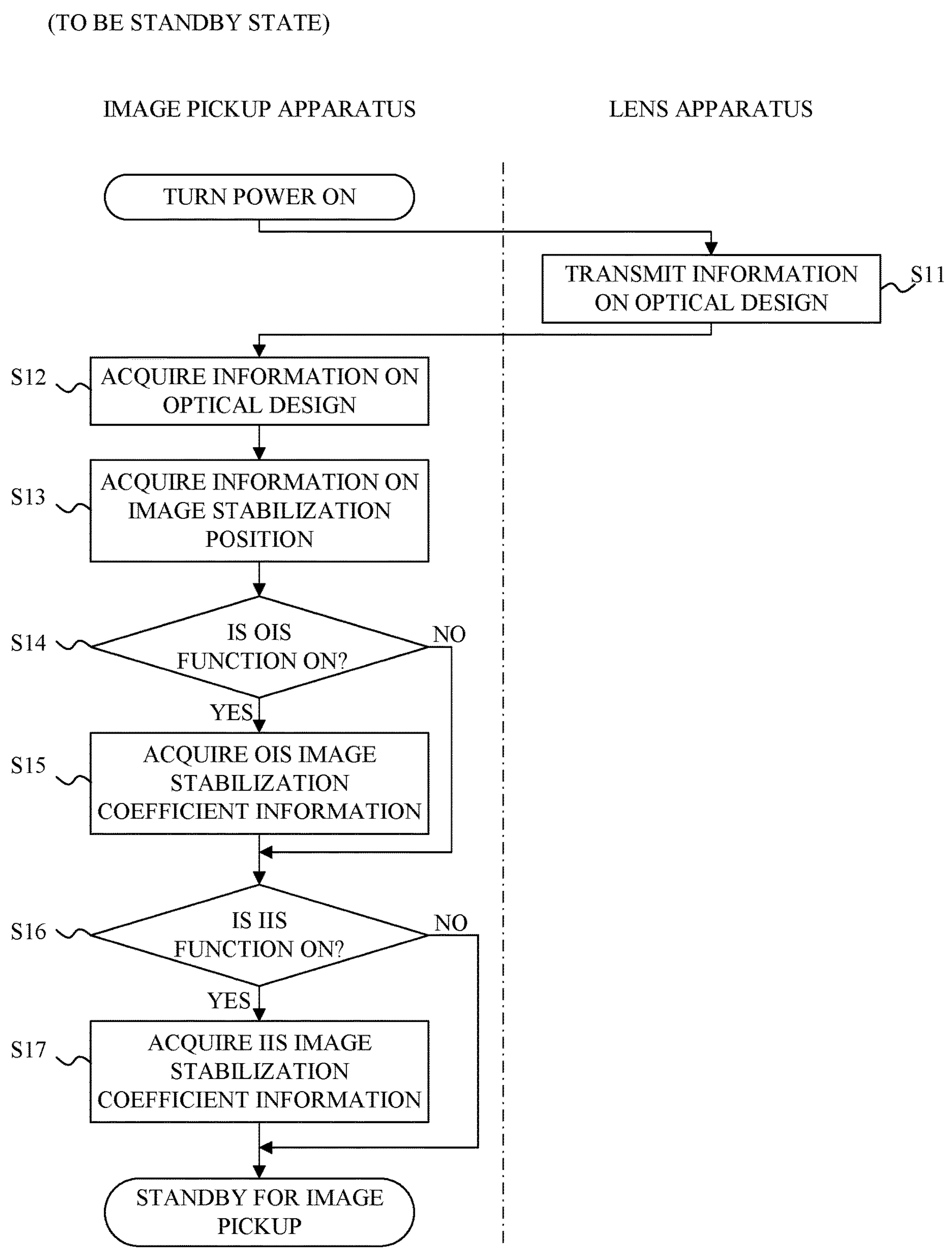
FIG. 10A illustrates a flow from a state in which power of an image pickup system is turned on to a state in which an image-stabilization function is turned on and the image pickup apparatus becomes an image pickup standby state.
Figure 10B:
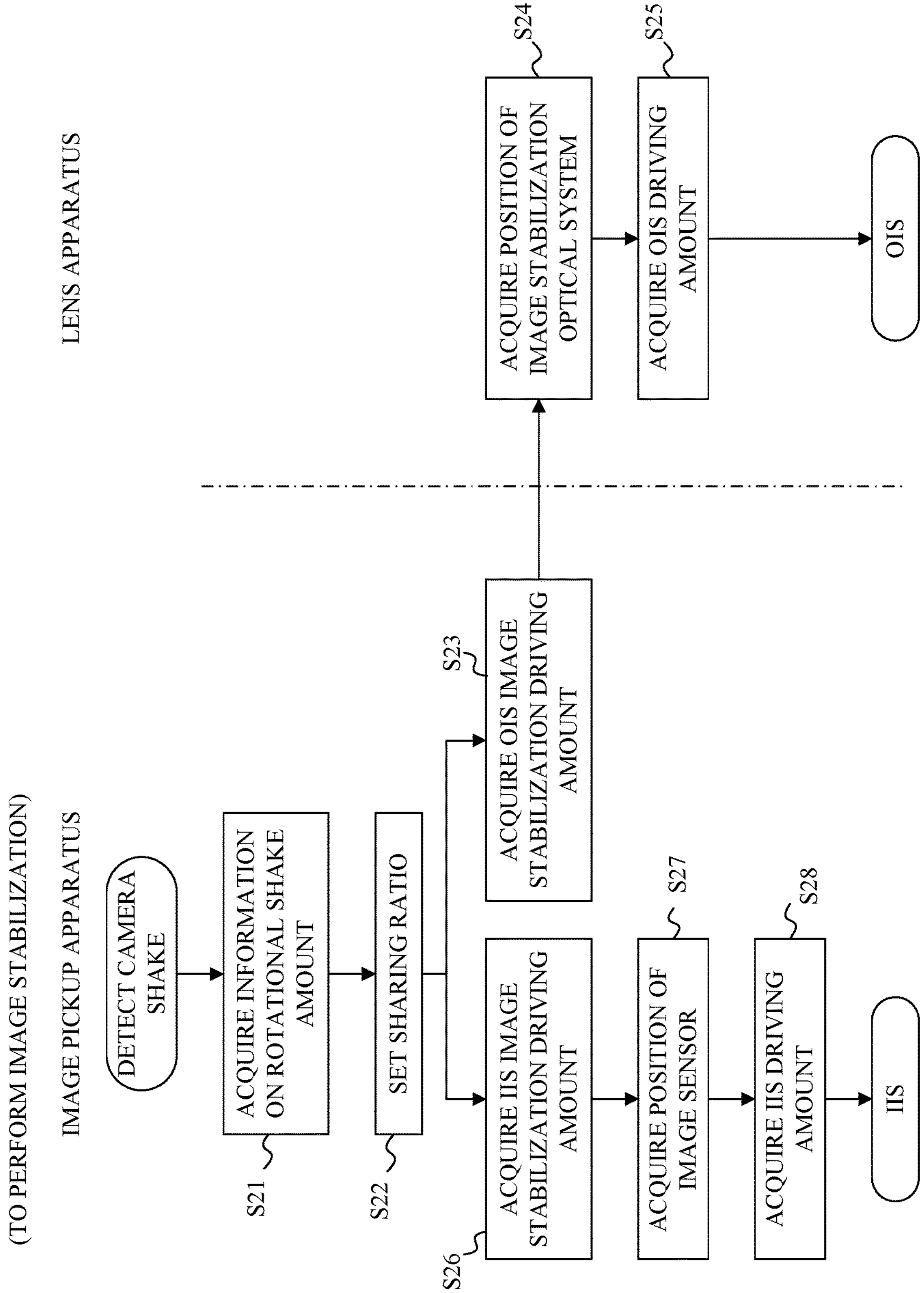
FIG. 10B illustrates a flow for performing image stabilization for a rotational shake during image pickup.

FIG. 10A illustrates a flow from a state in which power of the image pickup system 1 is turned on to a state in which the image-stabilization function is turned on and the image pickup apparatus 200 becomes an image pickup standby state. FIG. 10B illustrates a flow for performing image stabilization for a rotational shake during image pickup.

The flow of FIG. 10A is started by turning on the power of the image pickup system 1.

In step S11, the lens microcomputer 102 transmits information on optical design of the image pickup optical system 101 to the camera microcomputer 202, the information on the optical design having been stored in the lens memory 106 and acquired by the lens acquisition unit 1021.

In step S12, the camera acquisition unit 2021 acquires the information on the optical design transmitted by the lens microcomputer 102.

In step S13, the camera acquisition unit 2021 acquires information on an image stabilizing position set in the image pickup apparatus 200.

In step S14, the camera microcomputer 202 determines whether or not the OIS function has been turned on. If the camera microcomputer 202 determines that the OIS function has been turned on, the process proceeds to step S15, and if the camera microcomputer 202 determines that the OIS function has not been turned on, the process proceeds to step S16.

In step S15, the OIS image stabilization coefficient information acquisition unit 2022 acquires, from the image stabilization coefficient table, the OIS image stabilization coefficient information ($K_1$, $K_2$, $K_3$, $K_4$) based on the information on the image stabilizing position and information on a focal length and an object distance set in the lens apparatus 100.

In step S16, the camera microcomputer 202 determines whether or not the IIS function has been turned on. If the camera microcomputer 202 determines that the IIS function has been turned on, the process proceeds to step S17, and if the camera microcomputer 202 determines that the IIS function has not been turned on, the camera microcomputer 202 sets the image pickup apparatus 200 to the image pickup standby state.

In step S17, the IIS image stabilization coefficient information acquisition unit 2023 acquires, from the image stabilization coefficient table, the IIS image stabilization coefficient information ($K'_1$, $K'_2$, $K'_3$, $K'_4$) based on the information on the image stabilizing position and the information on the focal length and the object distance set in the lens apparatus 100.

In the flow of FIG. 10B described below, it is assumed that both the OIS function and the IIS function have been turned on.

In response to the camera shake being detected by the gyro sensor 205 (in response to detection of an angular velocity) during image pickup (exposure), the camera microcomputer 202 acquires information on the rotational shake amount from the gyro sensor 205 in step S21.

In step S22, the setting unit 2024 sets a ratio between image stabilization by OIS and image stabilization by IIS (sharing ratio). In this embodiment, the sharing ratio is set such that 50% of image stabilization is performed by OIS and 50% of image stabilization is performed by IIS.

In step S23, the OIS image stabilizing driving amount acquisition unit 2025 acquires the OIS image stabilizing driving amount (first image stabilizing driving amount) by using the OIS image stabilization coefficient information ($K_1$, $K_2$, $K_3$, $K_4$), the information on the rotational shake amount, and the sharing ratio.

In step S24, the OIS control unit 1022 acquires the position of the image stabilizing optical system 1014 output from the OIS encoder 103.

In step S25, the OIS control unit 1022 acquires the OIS driving amount of the OIS actuator 105 such that the movable range of the OIS actuator 105 is not exceeded. If the OIS driving amount and the OIS image stabilizing driving amount match, 50% of the image blur amount is reduced by OIS.

After the process of step S25, the OIS control unit 1022 drives the OIS actuator 105 via the OIS driver 104.

In step S26, the IIS image stabilizing driving amount acquisition unit 2026 acquires the IIS image stabilizing driving amount (second image stabilizing driving amount) by using the IIS image stabilization coefficient information ($K'_1$, $K'_2$, $K'_3$, $K'_4$), the information on the rotational shake amount, and the sharing ratio.

In step S27, the IIS control unit 207 acquires the position of the image sensor 201 output from the IIS encoder 208.

In step S28, the IIS control unit 207 acquires the IIS driving amount of the IIS actuator 210 such that the movable range of the IIS actuator 210 is not exceeded. If the IIS driving amount and the IIS image stabilizing driving amount match, 50% of the image blur amount is reduced by IIS.

The processing of steps S26 to S28 is executed in parallel with the processing of steps S23 to S25.

EXAMPLES

Hereinafter, examples will be described of the image pickup optical system 101 of the present disclosure with reference to the accompanying drawings.

Figure 11:
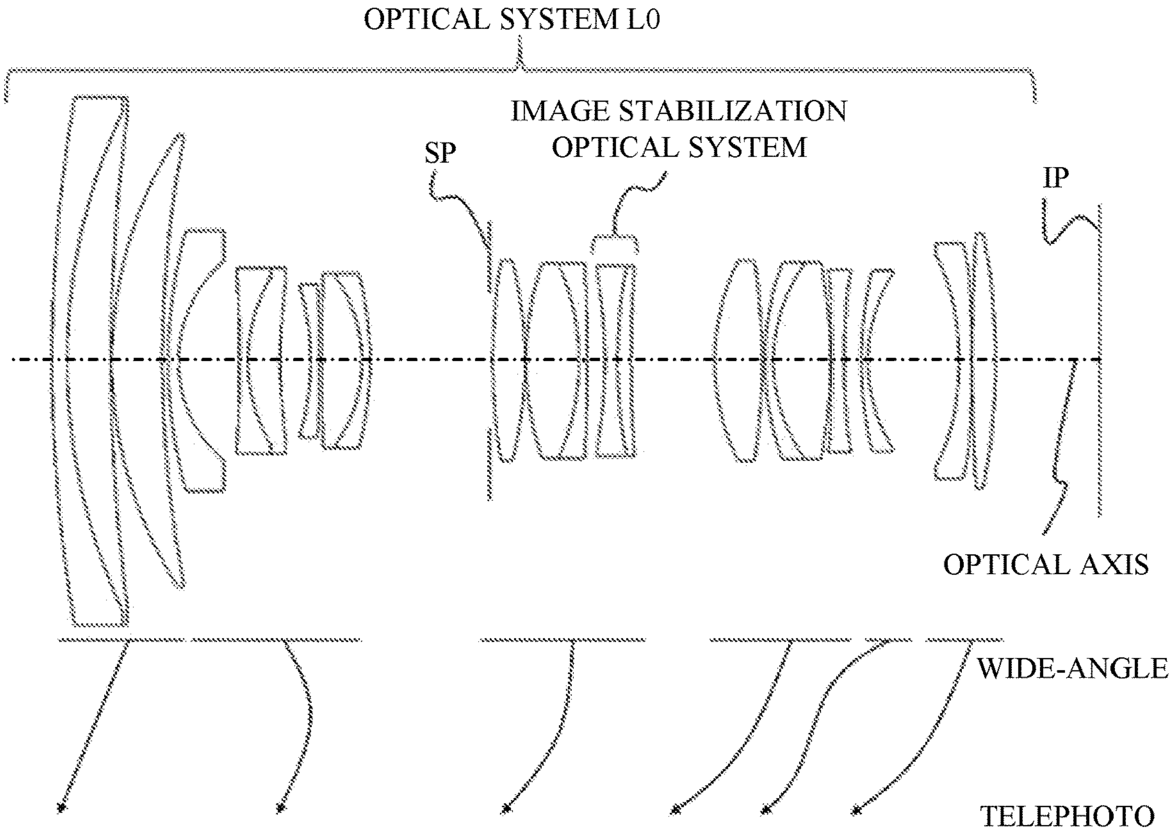
FIG. 11 is a sectional view illustrating an optical system according to Example 1 at a wide-angle end focusing on an object at an infinite distance.
Figure 13:
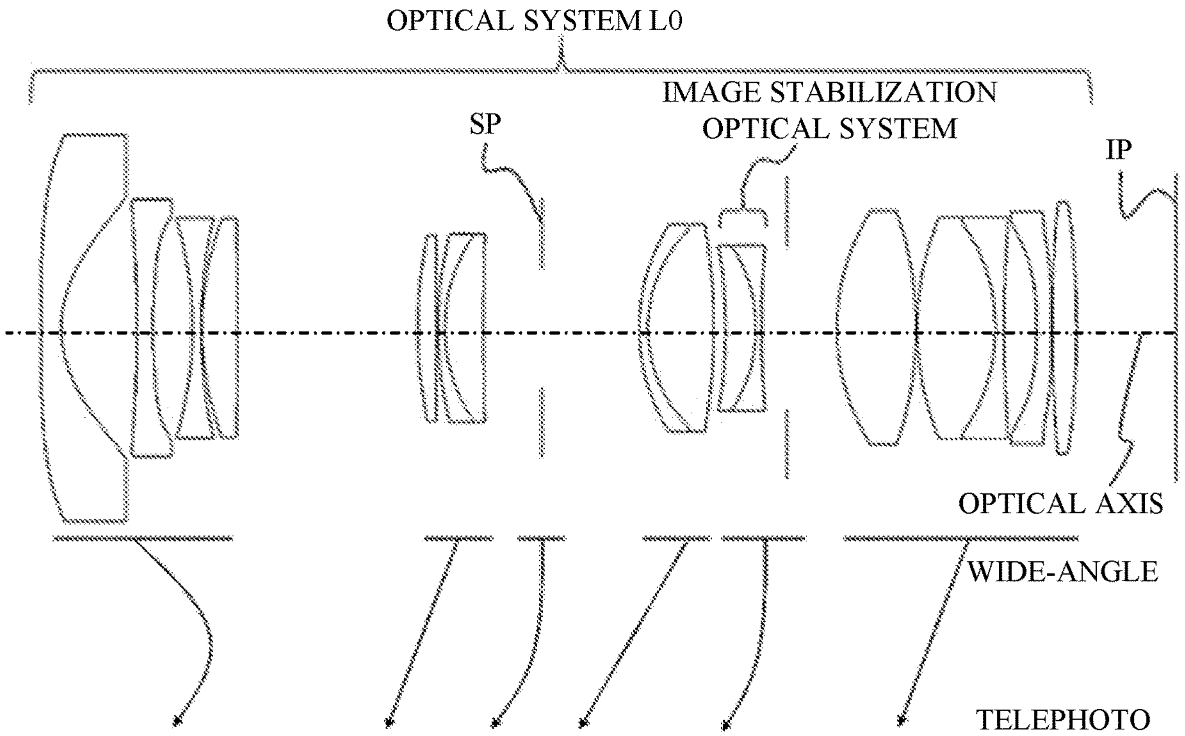
FIG. 13 is a sectional view illustrating an optical system according to Example 2 at a wide-angle end focusing on an object at an infinite distance.
Figure 15:
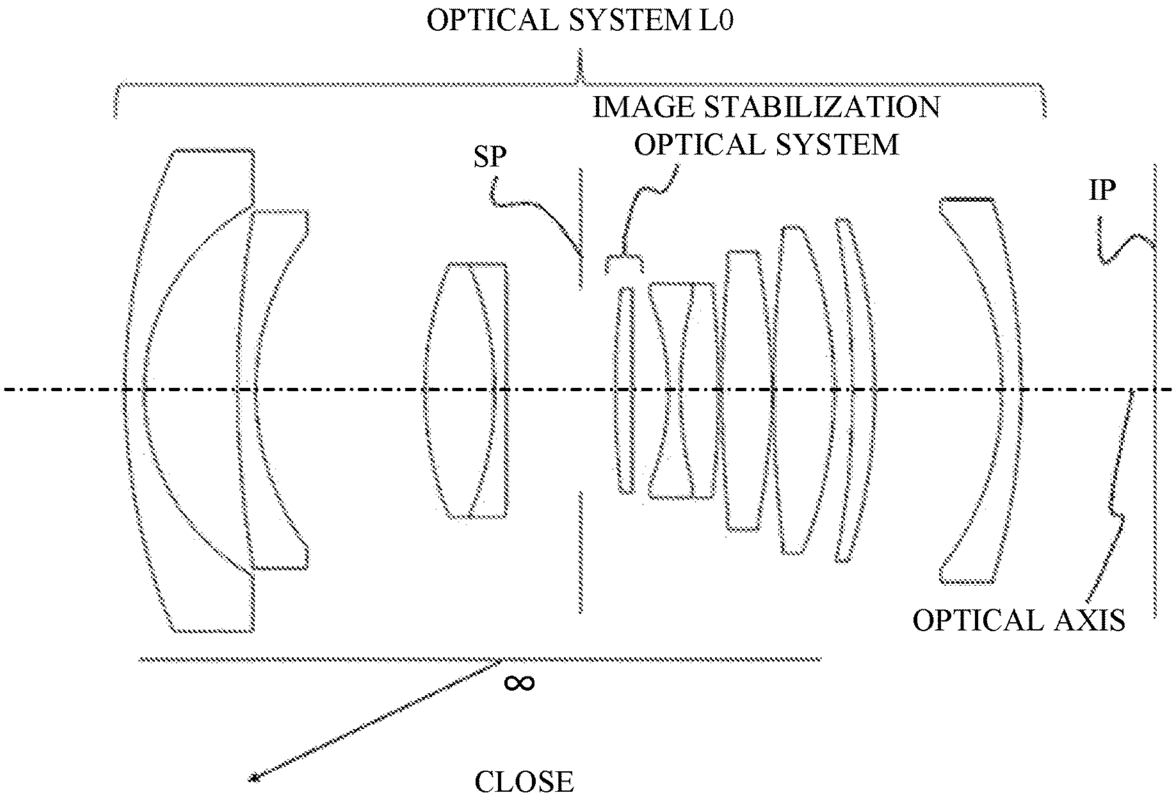
FIG. 15 is a sectional view illustrating an optical system according to Example 3 focusing on an object at an infinite distance.

FIGS. 11 and 13 are sectional views illustrating optical systems L0 at wide-angle ends each focusing on an object at an infinite distance according to the first and second examples, respectively. Arrows in each sectional view represent a movement trajectory of each lens unit during zooming from the wide-angle end to a telephoto end. FIG. 15 is a sectional view illustrating the optical system L0 focusing on an object at an infinite distance according to the third embodiment. An arrow in FIG. 15 represents a movement trajectory of lens units during focusing from the infinite distance to a short distance. The optical system L0 according to each example is used in an image pickup apparatus such as a digital video camera, a digital still camera, a broadcasting camera, a surveillance camera, and a smartphone camera.

In each sectional view, a left side is an object side and a right side is an image side. The optical system L0 according to each example includes a plurality of lens units. In this specification, a lens unit is a group of lenses that move and stop integrally during zooming, focusing, or image stabilization. That is, in the optical system L0 according to each example, each distance between adjacent lens units varies during zooming or focusing. A lens unit may be a single lens or may include a plurality of lenses. A lens unit may include a diaphragm.

SP represents a diaphragm. IP represents an image plane and is an image pickup plane of an image sensor (photoelectric conversion element) such as a CCD sensor and a CMOS sensor. The image stabilizing optical system is decentered from an optical axis of the optical system L0 during OIS.

Figure 12:
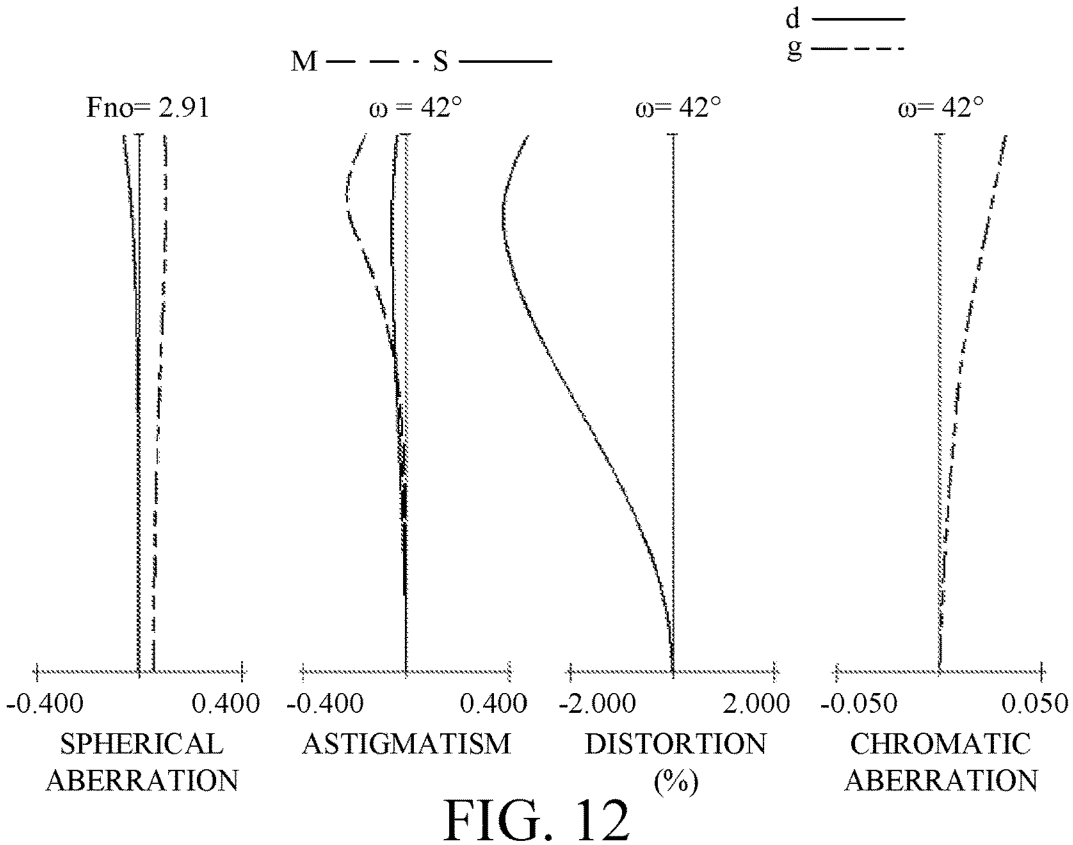
FIG. 12 is an aberration diagram in a state where the optical system according to Example 1 at the wide-angle end focuses on the object at the infinite distance.
Figure 14:
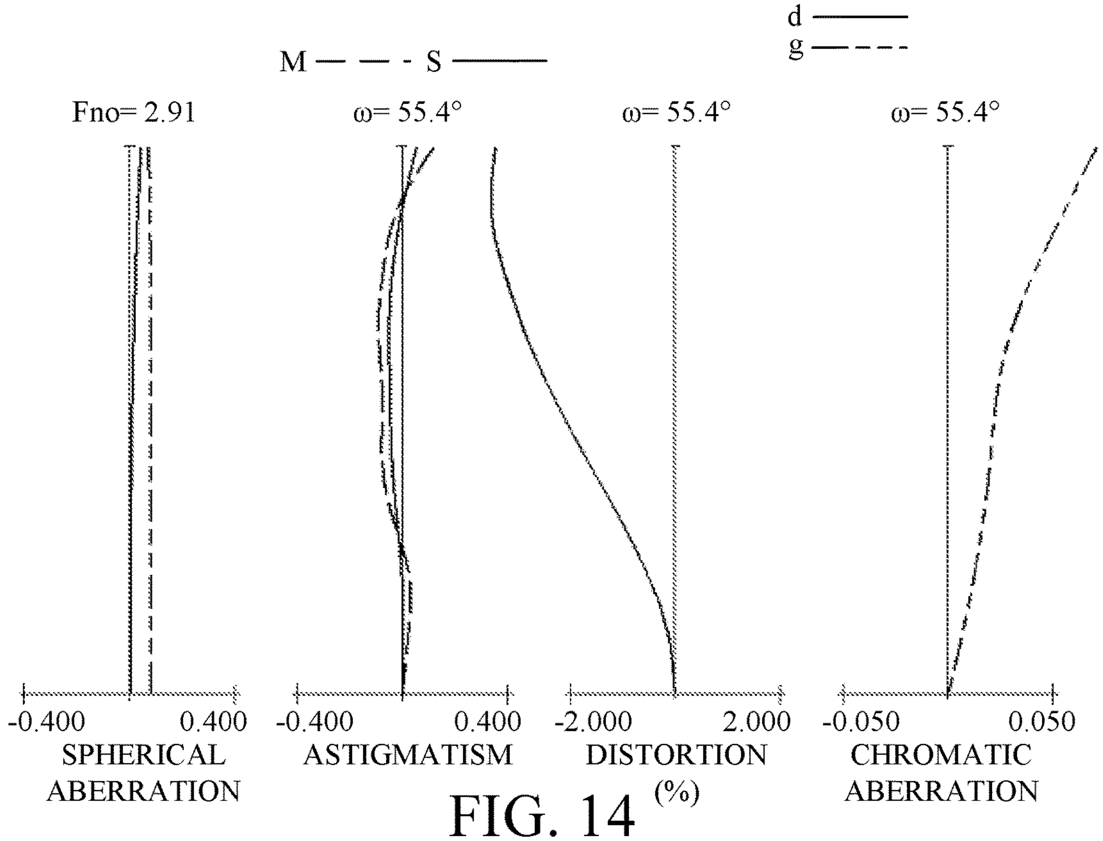
FIG. 14 is an aberration diagram in a state where the optical system according to Example 2 at the wide-angle end focuses on the object at the infinite distance.
Figure 16:
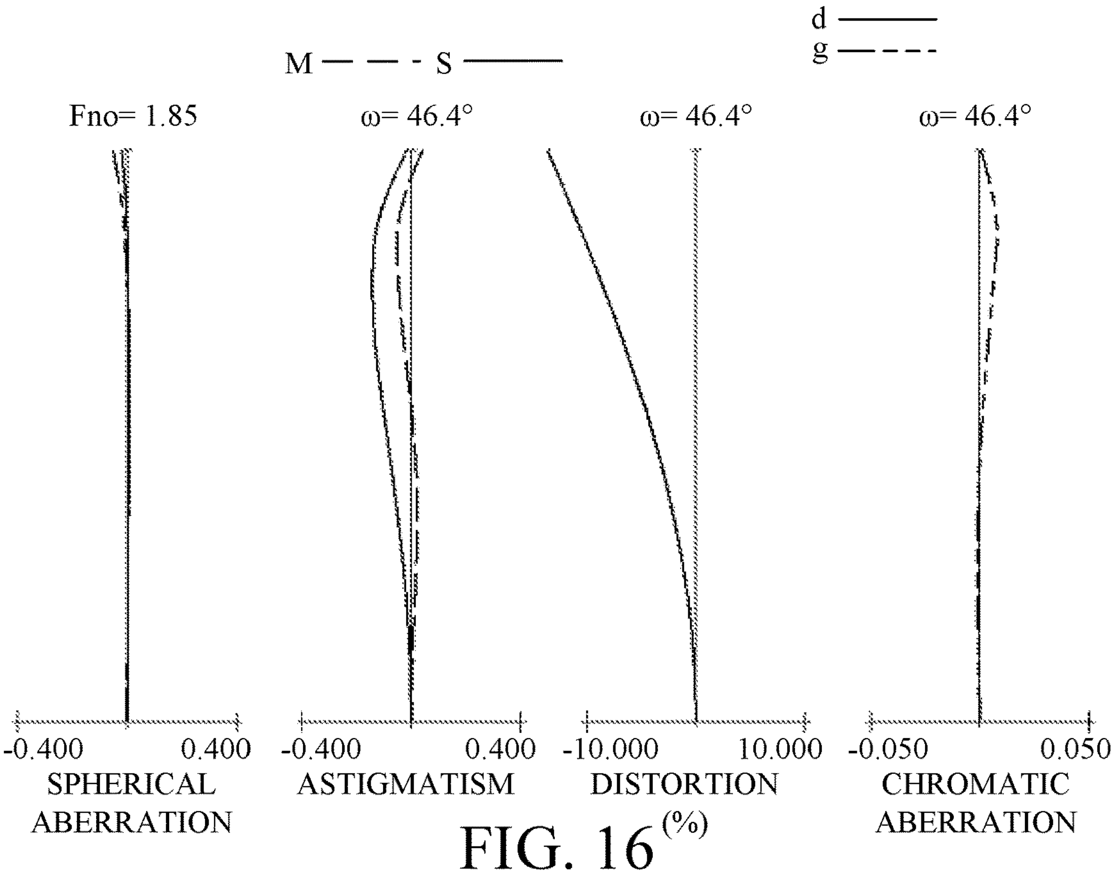
FIG. 16 is an aberration diagram in a state where the optical system according to Example 3 focuses on the object at the infinite distance.

FIGS. 12 and 14 are aberration diagrams when the optical systems L0 at the wide-angle ends focus on the objects at the infinite distances according to the first and second embodiments, respectively. FIG. 16 is an aberration diagram when the optical system L0 focuses on the object at the infinite distance according to the third embodiment.

In each spherical aberration diagram, Fno represents an F-number, and amounts of spherical aberration at a d-line (wavelength 587.6 nm) and a g-line (wavelength 435.8 nm) are indicated. In each astigmatism diagram, S indicates an amount of astigmatism in a sagittal image plane, and M indicates an amount of astigmatism in a meridional image plane. In each distortion diagram, an amount of distortion at the d-line is indicated. Each chromatic aberration diagram indicates an amount of lateral chromatic aberration at the g-line. ω represents an image pickup half angle of view (°).

Numerical Examples 1 to 3 corresponding to Examples 1 to 3 are given below.

In surface data of each numerical example, r represents a curvature radius of an optical surface, and d (mm) represents an on-axis distance (distance on an optical axis) between an m-th surface and an (m+1)-th surface, m representing the number of the surface counted from a light entering surface. nd represents a refractive index at the d-line of an optical member, and vd represents an Abbe number of an optical member. An Abbe number vd of a certain material is expressed by the following equation where Nd, NF, and NC represent refractive indexes at the d-line (wavelength 587.6 nm), F-line (wavelength 486.1 nm), and C-line (wavelength 656.3 nm) of Fraunhofer lines, respectively.

$$vd=(Nd-1)/(NF-NC)$$

In each numerical example, d, a focal length (mm), an F-number, and a half angle of view (°) are all values in a state where the optical system L0 according to the example focuses on the object at the infinite distance. A back focus (BF) is an air conversion length of a distance on the optical axis from a last lens surface (a lens surface closest to the image side) to a paraxial image plane. An overall optical length is a length acquired by adding the back focus to a distance on the optical axis from a front lens surface (a lens surface closest to the object side) to the last lens surface.

A * sign is attached to a right side of a surface number of an optical surface which is an aspherical surface. An aspherical shape is expressed by the following equation where X represents an amount of displacement from a surface vertex in the optical axis direction, h represents a height from the optical axis in the direction orthogonal to the optical axis, R represents a paraxial curvature radius, k represents a conic constant, A4, A6, A8, A10, and A12 represent aspherical surface coefficients of respective orders.

$$X=(h^2/R)/[1+\{1-(1+k(h/R)^2\}^{1/2}]+A4\times h^4+A6\times h^6+A8\times h^8+A10\times h^{10}+A12\times h^{12}+A14\times h^{14}+A16\times h^{16}$$

"e±XX" in each aspherical surface coefficient represents "$\times 10^{\pm XX}$".

In each numerical example, tilt-image shift sensitivity data and decentering-image shift sensitivity data are given. Methods for acquiring these pieces of data is described below with reference to FIGS. 17A to 17C.

Figure 17A:
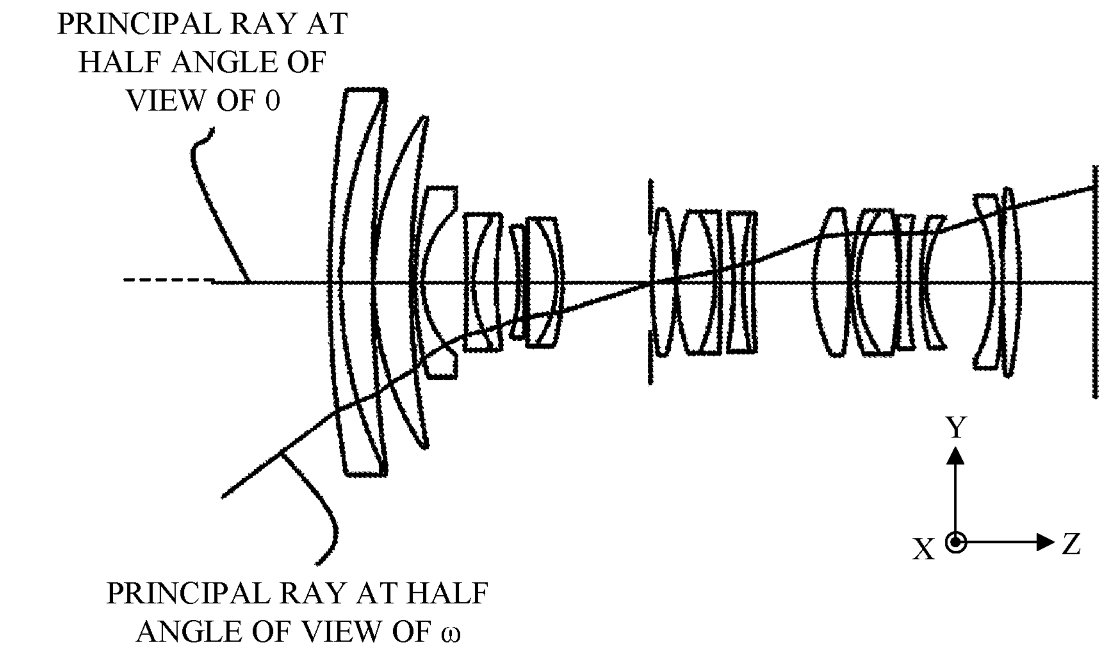
FIGS. 17A to 17C are diagrams illustrating ray traces of principal rays at a d-line for respective angle of views, the principal rays entering from an object surface of the optical system according to Example 1.
Figure 17B:
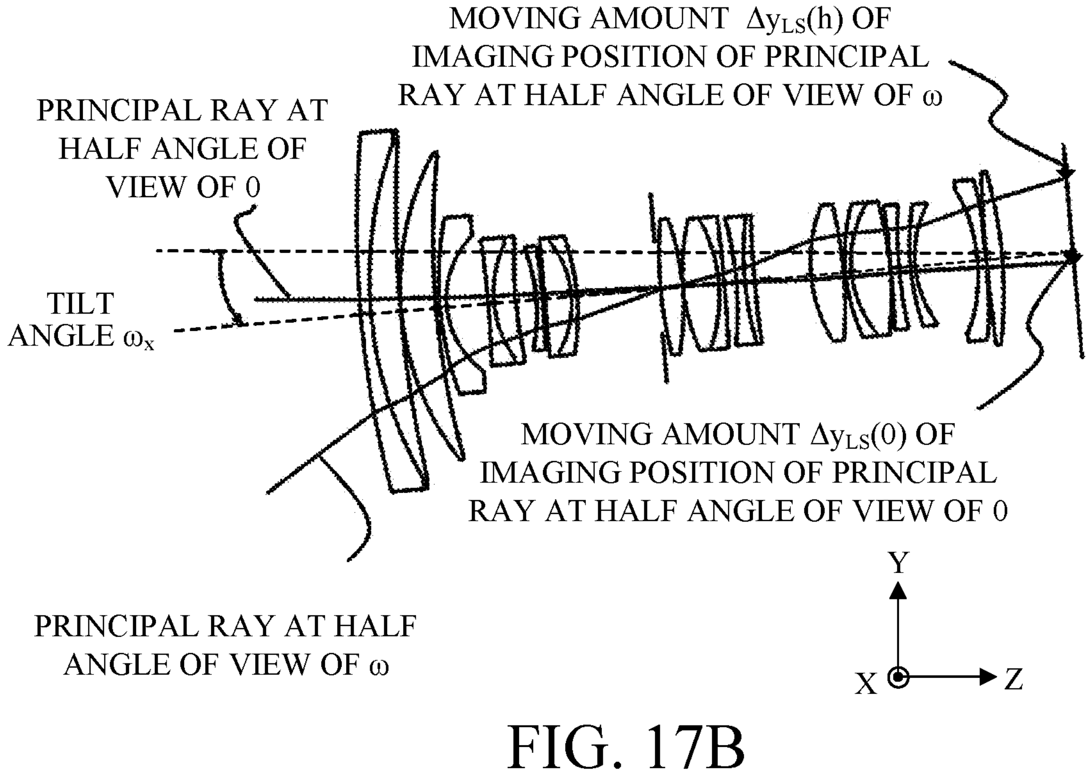
Figure 17C:
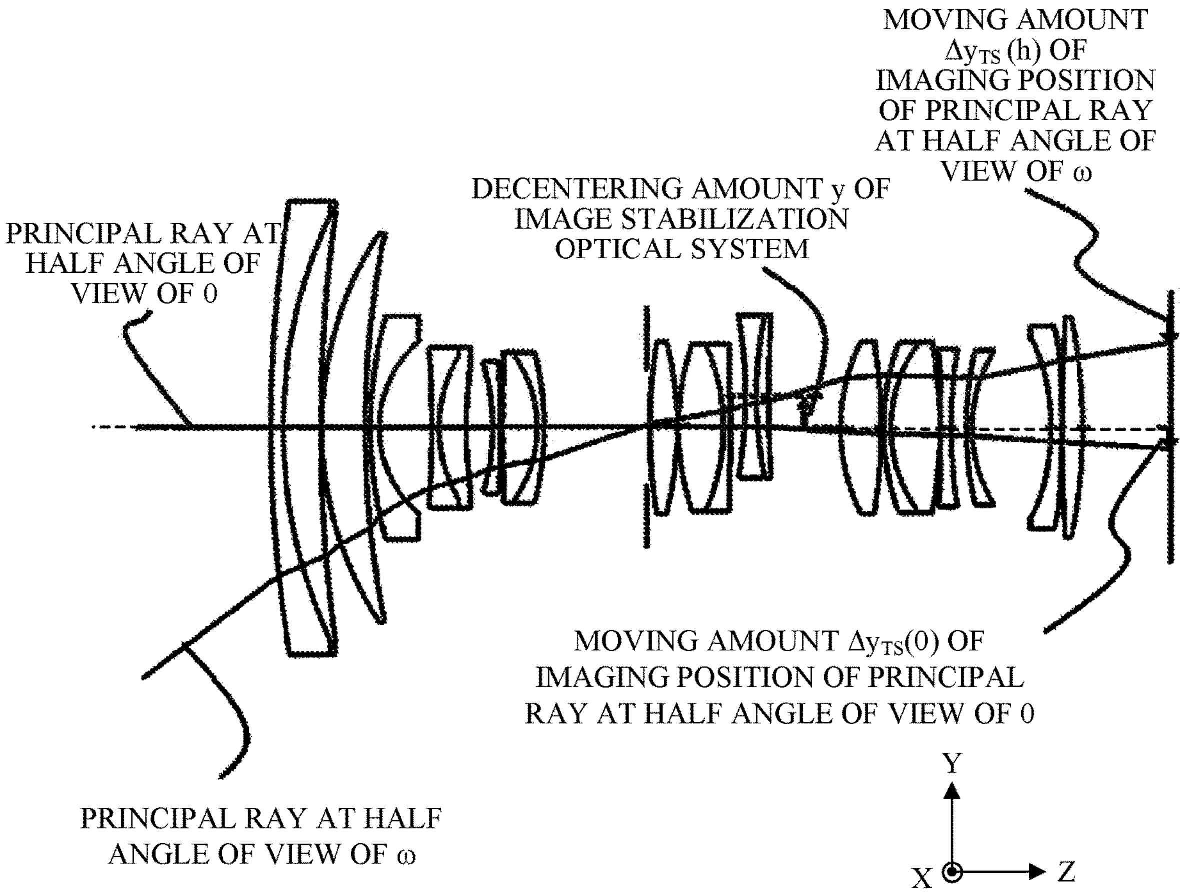
Figure 18A:
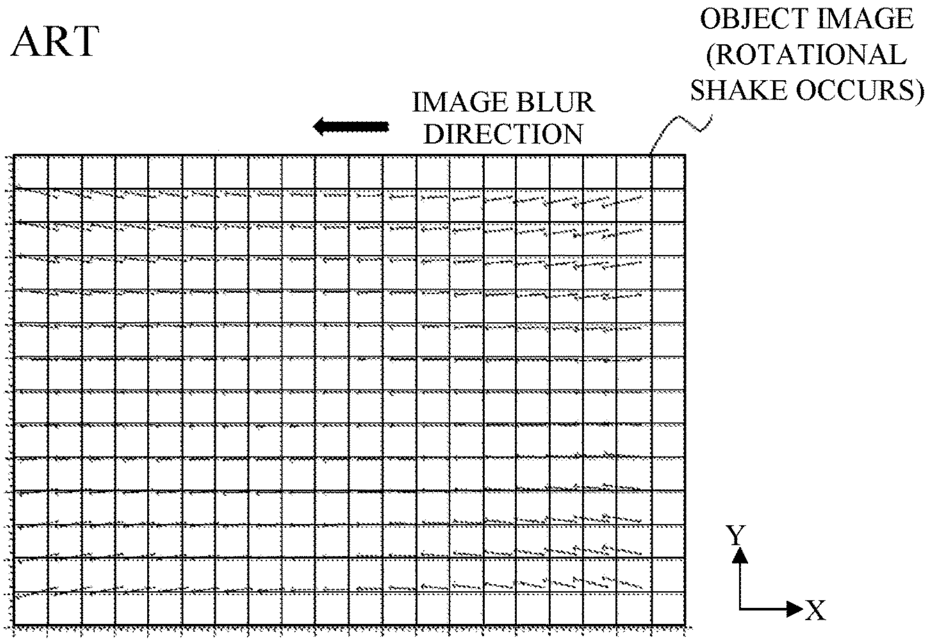
FIG. 18A illustrates a ratio and a direction of an image point moving amount at each image point on an object image in a case where image blur occurs in a —X-axis direction in a central part of an image, the image blur caused by a rotational shake.
Figure 18B:
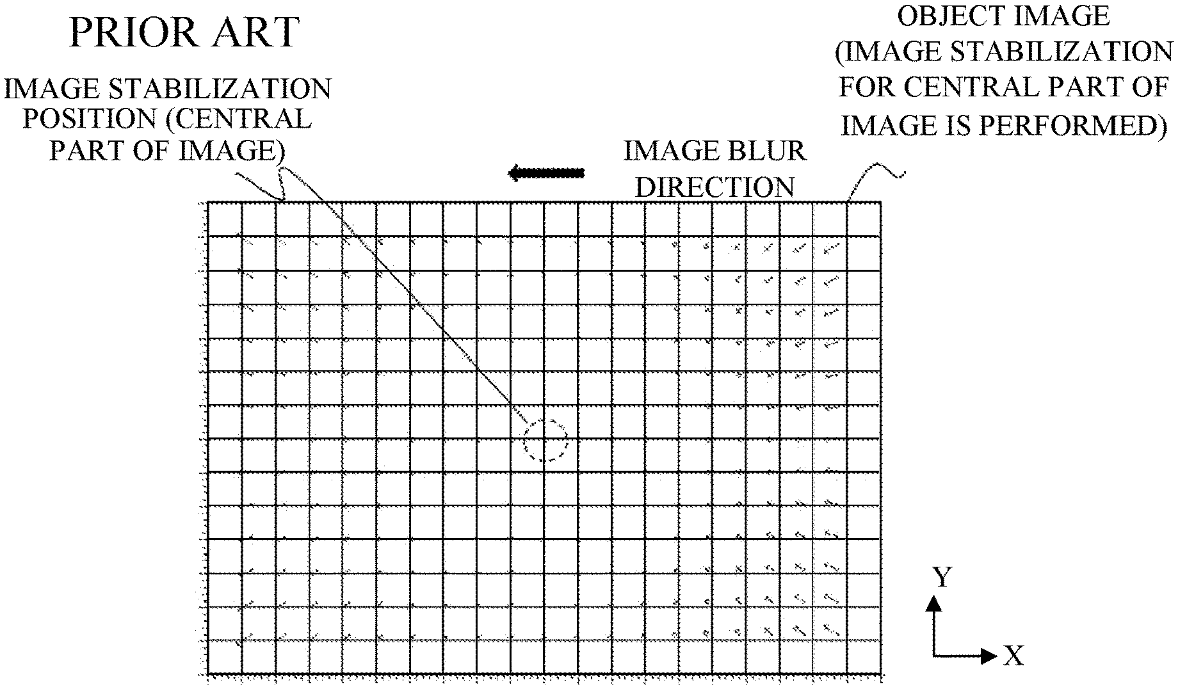
FIG. 18B illustrates arrows each indicating a ratio and a direction of an image point moving amount of a blur residual remained at an image point in a case where the image blur at the central part of the image of FIG. 18A is reduced by a lens shift type image stabilizing mechanism.

FIGS. 17A to 17C are diagrams of ray traces of principal rays at the d-line of respective angle of views (a principal ray at a half angle of view of 0 and a principal ray at a half angle of view of w), the principal rays entering from an object-side surface of the optical system L0 according to Example 1. FIGS. 17A to 17C illustrate the optical system L0 at a stationary state, at a state in which an image stabilizing optical system tilts by a tilt angle $\omega_x$ around the X-axis about an intersection of an image plane IP and the optical axis, and at a state in which the image stabilizing optical system is decentered by a decentering amount y in the Y-axis direction.

Tilt-image shift sensitivity for each image height in the tilt direction (R direction) is acquired by dividing an image point moving amount $\Delta y_{LSr}$ ($h_r$) by the tilt angle $\omega_x$, the image point moving amount $\Delta y_{LSr}$ ($h_r$) being a difference in imaging positions on the image plane IP corresponding to the respective half angle of views of FIGS. 17A and 17B. The tilt-image shift sensitivity for each image height in a direction orthogonal to the tilt direction is acquired by using an image point moving amount $\Delta y_{LS\theta}$ for each image height $h_\theta$ in the X-axis direction. In each example, the tilt-image shift sensitivity is acquired from the image point moving amount when the optical system L0 tilts by 0.5°. With respect to the sign of the tilt angle $\omega_x$, a counterclockwise direction in FIG. 17B is positive and a clockwise direction in FIG. 17B is negative. With respect to the sign of the image point moving amount Δy, an upward direction in FIG. 17B is positive and a downward direction in FIG. 17B is negative.

Decentering-image shift sensitivity for each image height in a decentering direction (R direction) is acquired by dividing an image point moving amount $\Delta y_{TSr}$ ($h_r$) by a decentering amount y of the image stabilizing optical system, the image point moving amount $\Delta y_{TSr}$ being a difference in the imaging positions on the image plane IP corresponding to respective half angle of views of FIGS. 17A and 17C. In each example, the decentering-image shift sensitivity for each image height in the direction orthogonal to the decentering direction is acquired by using the image point moving amount $\Delta y_{TS\theta}$ for each image height $h_\theta$ in the X-axis direction. The decentering-image shift sensitivity data in each embodiment is acquired from the image point moving amount in a case where the image stabilizing optical system is decentered by 0.1 mm.

Numerical Example 1

Unit: mm

SURFACE DATA

| Surface Number | r | d | nd | vd |
|---|---|---|---|---|
| 1 | 211.125 | 2.10 | 1.80810 | 22.8 |
| 2 | 80.660 | 6.03 | 1.77250 | 49.6 |
| 3 | 248.854 | 0.15 | | |
| 4 | 57.558 | 6.97 | 1.77250 | 49.6 |
| 5 | 160.440 | (variable) | | |
| 6 | 66.217 | 1.40 | 1.88300 | 40.8 |
| 7 | 18.113 | 8.41 | | |
| 8 | −206.710 | 1.20 | 1.61800 | 63.4 |
| 9 | 22.688 | 4.36 | 1.85478 | 24.8 |
| 10 | 79.196 | 4.20 | | |
| 11 | −35.317 | 1.20 | 1.58313 | 59.4 |
| 12* | −312.513 | 0.43 | | |
| 13 | 910.041 | 5.47 | 1.59270 | 35.3 |
| 14 | −19.928 | 1.10 | 1.88300 | 40.8 |
| 15 | −47.138 | (variable) | | |
| 16 (diaphragm) | ∞ | 0.40 | | |
| 17 | 81.194 | 4.45 | 1.83481 | 42.7 |
| 18 | −54.244 | 0.15 | | |
| 19 | 41.217 | 7.25 | 1.49700 | 81.5 |
| 20 | −32.257 | 1.10 | 2.00069 | 25.5 |
| 21 | −293.896 | 2.41 | | |
| 22* | −71.464 | 1.75 | 1.76802 | 49.2 |
| 23 | 64.990 | 1.91 | 1.80810 | 22.8 |
| 24 | 199.742 | (variable) | | |
| 25 | 30.855 | 6.56 | 1.59522 | 67.7 |
| 26 | −85.643 | 0.35 | | |
| 27 | 38.493 | 1.20 | 1.73800 | 32.3 |
| 28 | 22.868 | 7.83 | 1.53775 | 74.7 |
| 29 | −71.877 | 0.15 | | |
| 30* | −4310.465 | 1.70 | 1.85400 | 40.4 |
| 31* | 109.508 | (variable) | | |
| 32 | 53.194 | 0.90 | 1.80400 | 46.6 |
| 33 | 22.891 | (variable) | | |
| 34* | −42.821 | 1.70 | 1.58313 | 59.4 |
| 35* | −2156.781 | 0.15 | | |
| 36 | 344.261 | 3.20 | 2.00100 | 29.1 |
| 37 | −88.670 | (variable) | | |
| Image Plane | ∞ | | | |

ASPHERICAL SURFACE DATA

12th Surface
K = 0.00000e+000 A4 = −5.69442e−006 A6 = −2.29053e−009
A8 = −4.72363e−011 A10 = 4.65343e−013 A12 = −1.99227e−015
22nd Surface
K = 0.00000e+00 A4 = 1.87606e−006 A6 = 1.45872e−009
A8 = 2.78338e−011 A10 = −2.10980e−013 A12 = 3.98590e−016
30th Surface
K = 0.00000e+00 A4 = −2.01869e−005 A6 = 6.17344e−008
A8 = −2.64177e−010 A10 = −2.98832e−013 A12 = 2.64092e−015
31st Surface
K = 0.00000e+00 A4 = 1.63774e−006 A6 = 9.32838e−008
A8 = −2.34772e−010 A10 = −7.39973e−013 A12 = 4.51086e−015

-continued

Unit: mm

34th Surface
K = 0.00000e+00 A4 = −2.51719e−005 A6 = 1.25180e−007
A8 = −5.32709e−010 A10 = 5.08044e−013 A12 = 7.30860e−016
35th Surface
K = 0.00000e+00 A4 = −2.60571e−005 A6 = 1.26402e−007
A8 = −6.23562e−010 A10 = 1.45147e−012 A12 = −1.39940e−015

VARIOUS DATA
Zoom Ratio 2.74

| | Wide-Angle | Middle | Telephoto |
|---|---|---|---|
| Focal Length: | 24.72 | 43.76 | 67.66 |
| F-Number: | 2.91 | 2.91 | 2.91 |
| Half Angle of View (°): | 42.00 | 25.95 | 17.34 |
| Image Height: | 21.64 | 21.64 | 21.64 |
| Overall Optical Length: | 144.33 | 158.18 | 172.04 |
| BF: | 14.30 | 25.72 | 35.98 |
| d5 | 0.80 | 17.81 | 28.91 |
| d15 | 16.54 | 8.10 | 2.46 |
| d24 | 11.55 | 5.41 | 3.56 |
| d31 | 2.38 | 1.11 | 0.91 |
| d33 | 12.58 | 13.85 | 14.04 |
| d37 | 14.30 | 25.72 | 35.98 |

Tilt-Image Shift Sensitivity Data for Each Image Height in Tilt Direction at Wide-Angle End

| Half Angle of View ω [deg] | Image Height $h_r$ [mm] | Image Point Moving Amount after Shake of 0.5 deg $\Delta y_{LSr}$ [mm] | Tilt-Image Shift Sensitivity $LS_r$ ($h_r$) [mm/deg] | Tilt-Image Shift Sensitivity Coefficient $k_{LS\_r}$ ($h_r$) |
|---|---|---|---|---|
| 0 | 0.000 | −0.216 | −0.431 | 1.000 |
| 6.9 | 3.000 | −0.218 | −0.435 | 1.009 |
| 13.7 | 6.000 | −0.224 | −0.448 | 1.038 |
| 20.3 | 9.000 | −0.235 | −0.471 | 1.091 |
| 26.4 | 12.000 | −0.254 | −0.507 | 1.176 |
| 32.0 | 15.001 | −0.281 | −0.562 | 1.303 |
| 37.0 | 18.001 | −0.322 | −0.645 | 1.494 |
| 41.2 | 21.000 | −0.385 | −0.770 | 1.784 |

Tilt-Image Shift Sensitivity Data for Each Image Height in Direction Orthogonal to Tilt Direction at Wide-Angle End

| Half Angle of View ω [deg] | Image Height $h_\theta$ [mm] | Image Point Moving Amount after Shake of 0.5 deg $\Delta y_{LS\theta}$ [mm] | Tilt-Image Shift Sensitivity $LS_\theta$ ($h_\theta$) [mm/deg] | Tilt-Image Shift Sensitivity Coefficient $k_{LS\_\theta}$ ($h_\theta$) |
|---|---|---|---|---|
| 0 | 0.000 | −0.216 | −0.431 | 1.000 |
| 6.9 | 3.000 | −0.215 | −0.431 | 0.998 |
| 13.7 | 6.000 | −0.214 | −0.429 | 0.993 |
| 20.3 | 9.000 | −0.213 | −0.425 | 0.986 |
| 26.4 | 12.000 | −0.211 | −0.422 | 0.978 |
| 32.0 | 15.001 | −0.209 | −0.419 | 0.971 |

| Half Angle of View ω [deg] | Image Height $h_\theta$ [mm] | Image Point Moving Amount after Shake of 0.5 deg $\Delta y_{LS\theta}$ [mm] | Tilt-Image Shift Sensitivity $LS_\theta$ ($h_\theta$) [mm/deg] | Tilt-Image Shift Sensitivity Coefficient $k_{LS\_\theta}$ ($h_\theta$) |
|---|---|---|---|---|
| 37.0 | 18.001 | −0.209 | −0.418 | 0.868 |
| 41.2 | 21.000 | −0.209 | −0.419 | 0.971 |

Decentering-Image Shift Sensitivity Data for Each Image Height in Decentering Direction at Wide-Angle End

| Half Angle of View ω [deg] | Image Height $h_r$ [mm] | Image Point Moving Amount after Decentering of 0.1 mm $\Delta y_{TSr}$ [mm] | Decentering-Image Shift Sensitivity $TS_r$ ($h_r$) [mm/mm] | Decentering-Image Shift Sensitivity Coefficient $k_{TS\_r}$ ($h_r$) |
|---|---|---|---|---|
| 0 | 0.000 | −0.067 | −0.671 | 1.000 |
| 6.9 | 3.000 | −0.068 | −0.676 | 1.008 |
| 13.7 | 6.000 | −0.069 | −0.692 | 1.032 |
| 20.3 | 9.000 | −0.072 | −0.720 | 1.073 |
| 26.4 | 12.000 | −0.076 | −0.762 | 1.136 |
| 32.0 | 15.001 | −0.082 | −0.823 | 1.226 |
| 37.0 | 18.001 | −0.091 | −0.910 | 1.356 |
| 41.2 | 21.000 | −0.103 | −1.035 | 1.542 |

Decentering-Image Shift Sensitivity Data for Each Image Height in Direction Orthogonal to Decentering Direction at Wide-Angle End

| Half Angle of View ω [deg] | Image Height $h_\theta$ [mm] | Image Point Moving Amount after Decentering of 0.1 mm $\Delta y_{TS\theta}$ [mm] | Decentering-Image Shift Sensitivity $TS_\theta$ ($h_\theta$) [mm/mm] | Decentering-Image Shift Sensitivity Coefficient $k_{TS\_\theta}$ ($h_\theta$) |
|---|---|---|---|---|
| 0 | 0.000 | −0.067 | −0.671 | 1.000 |
| 6.9 | 3.000 | −0.067 | −0.673 | 1.003 |
| 13.7 | 6.000 | −0.068 | −0.680 | 1.014 |
| 20.3 | 9.000 | −0.069 | −0.692 | 1.031 |
| 26.4 | 12.000 | −0.071 | −0.708 | 1.055 |
| 32.0 | 15.001 | −0.073 | −0.729 | 1.087 |
| 37.0 | 18.001 | −0.076 | −0.756 | 1.127 |
| 41.2 | 21.000 | −0.079 | −0.788 | 1.175 |

Numerical Example 2

Unit: mm

SURFACE DATA

| Surface Number | r | d | nd | vd |
|---|---|---|---|---|
| 1* | 3000.000 | 2.85 | 1.58313 | 59.4 |
| 2* | 16.526 | 10.57 | | |
| 3* | −809.327 | 2.25 | 1.85400 | 40.4 |
| 4* | 91.828 | 5.56 | | |
| 5 | −53.256 | 1.20 | 1.59522 | 67.7 |
| 6 | 68.528 | 0.15 | | |

Unit: mm

| | | | | |
|---|---|---|---|---|
| 7 | 43.587 | 5.03 | 1.85478 | 24.8 |
| 8 | −485.244 | (variable) | | |
| 9 | 63.607 | 2.67 | 1.84666 | 23.9 |
| 10 | −1472.964 | 0.15 | | |
| 11 | 52.737 | 1.00 | 1.92286 | 20.9 |
| 12 | 22.996 | 5.41 | 1.53172 | 48.8 |
| 13 | 489.976 | (variable) | | |
| 14 (diaphragm) | ∞ | (variable) | | |
| 15 | 27.733 | 1.20 | 2.00069 | 25.5 |
| 16 | 19.641 | 9.29 | 1.53775 | 74.7 |
| 17 | −78.882 | (variable) | | |
| 18 | −67.558 | 4.31 | 1.92286 | 20.9 |
| 19 | −20.948 | 0.77 | 1.83400 | 37.2 |
| 20 | 136.126 | 3.52 | | |
| 21 | ∞ | (variable) | | |
| 22 | 30.487 | 11.20 | 1.49700 | 81.6 |
| 23 | −50.182 | 0.15 | | |
| 24 | 40.928 | 11.00 | 1.49700 | 81.6 |
| 25 | −25.800 | 1.20 | 2.05090 | 26.9 |
| 26 | 208.835 | 4.54 | | |
| 27* | −73.669 | 2.10 | 1.85400 | 40.4 |
| 28* | −1000.000 | 0.15 | | |
| 29 | 216.036 | 3.40 | 1.92286 | 20.9 |
| 30 | −127.538 | (variable) | | |
| Image Plane | ∞ | | | |

ASPHERICAL SURFACE DATA

1st Surface
K = 0.00000e+000 A4 = 8.30213e−006 A6 = −1.33976e−008
A8 = 4.25008e−011 A10 = −8.60253e−014 A12 = 1.03363e−016
A14 = −7.03702e−020 A16 = 2.16318e−023
2nd Surface
K = −9.81344e−001 A4 = 4.49709e−007 A6 = −2.34544e−008
A8 = −1.05516e−010 A10 = 8.07443e−013 A12 = −2.78552e−015
A14 = 3.05128e−018
3rd Surface
K = 0.00000e+00 A4 = −9.01759e−006 A6 = −1.39642e−007
A8 = 1.23272e−009 A10 = −3.49283e−012 A12 = 3.62808e−015
A14 = 5.24953e−019 A16 = −2.43479e−021
4th Surface
K = 0.00000e+00 A4 = 6.34981e−006 A6 = −1.29871e−007
A8 = 1.67920e−009 A10 = −6.48374e−012 A12 = 1.50043e−014
A14 = −1.59777e−017
27th Surface
K = 0.00000e+00 A4 = −8.04129e−005 A6 = 2.64851e−007
A8 = −1.06038e−009 A10 = 4.87911e−012 A12 = −8.56493e−015
A14 = −1.17880e−018 A16 = −3.10043e−023
28th Surface
K = 0.00000e+00 A4 = −6.00659e−005 A6 = 2.67376e−007
A8 = −7.05021e−010 A10 = 2.04492e−012 A12 = −2.97985e−015

VARIOUS DATA
Zoom Ratio 2.20

| | Wide-Angle | Middle | Telephoto |
|---|---|---|---|
| Focal Length: | 15.45 | 24.00 | 33.95 |
| F-Number: | 2.91 | 2.91 | 2.91 |
| Half Angle of View (°): | 55.41 | 41.57 | 31.88 |
| Image Height: | 21.64 | 21.64 | 21.64 |
| Overall Optical Length: | 159.58 | 147.48 | 144.99 |
| BF: | 14.00 | 22.21 | 32.15 |
| d8 | 25.32 | 7.72 | 1.50 |
| d13 | 8.24 | 11.30 | 7.40 |
| d14 | 13.71 | 5.42 | 0.71 |

-continued

| Unit: mm | | | |
|---|---|---|---|
| d17 | 1.60 | 9.89 | 14.61 |
| d21 | 7.04 | 1.27 | −1.05 |
| d30 | 14.00 | 22.21 | 32.15 |

Tilt-Image Shift Sensitivity Data for Each Image Height in Tilt Direction at Wide-Angle End

| Half Angle of View ω [deg] | Image Height $h_r$ [mm] | Image Point Moving Amount after Shake of 0.5 deg $\Delta y_{LSr}$ [mm] | Tilt-Image Shift Sensitivity $LS_r$ ($h_r$) [mm/deg] | Tilt-Image Shift Sensitivity Coefficient $k_{LS\_r}$ ($h_r$) |
|---|---|---|---|---|
| 0 | 0.000 | −0.135 | −0.270 | 1.000 |
| 11.0 | 3.000 | −0.139 | −0.278 | 1.030 |
| 21.4 | 6.000 | −0.152 | −0.303 | 0.124 |
| 30.6 | 9.001 | −0.174 | −0.348 | 1.291 |
| 38.5 | 12.002 | −0.208 | −0.415 | 1.540 |
| 45.0 | 15.002 | −0.253 | −0.505 | 1.873 |
| 50.3 | 18.000 | −0.311 | −0.621 | 2.304 |
| 54.6 | 21.000 | −0.388 | −0.776 | 2.878 |

Tilt-Image Shift Sensitivity Data for Each Image Height in Direction Orthogonal to Tilt Direction at Wide-Angle End

| Half Angle of View ω [deg] | Image Height $h_\theta$ [mm] | Image Point Moving Amount after Shake of 0.5 deg $\Delta y_{LS\theta}$ [mm] | Tilt-Image Shift Sensitivity $LS_\theta$ ($h_\theta$) [mm/deg] | Tilt-Image Shift Sensitivity Coefficient $k_{LS\_\theta}$ ($h_\theta$) |
|---|---|---|---|---|
| 0 | 0.000 | −0.135 | −0.270 | 1.000 |
| 11.0 | 3.000 | −0.135 | −0.269 | 0.998 |
| 21.4 | 6.000 | −0.134 | −0.267 | 0.992 |
| 30.6 | 9.001 | −0.133 | −0.265 | 0.984 |
| 38.5 | 12.002 | −0.132 | −0.263 | 0.976 |
| 45.0 | 15.002 | −0.131 | −0.262 | 0.971 |
| 50.3 | 18.000 | −0.130 | −0.261 | 0.966 |
| 54.6 | 21.000 | −0.130 | −0.260 | 0.965 |

Decentering-Image Shift Sensitivity Data for Each Image Height in Decentering Direction at Wide-Angle End

| Half Angle of View ω [deg] | Image Height $h_r$ [mm] | Image Point Moving Amount after Decentering of 0.1 mm $\Delta y_{TSr}$ [mm] | Decentering-Image Shift Sensitivity $TS_r$ ($h_r$) [mm/mm] | Decentering-Image Shift Sensitivity Coefficient $k_{TS\_r}$ ($h_r$) |
|---|---|---|---|---|
| 0 | 0.000 | −0.066 | −0.665 | 1.000 |
| 11.0 | 3.000 | −0.067 | −0.671 | 1.009 |
| 21.4 | 6.000 | −0.069 | −0.687 | 1.034 |
| 30.6 | 9.001 | −0.072 | −0.717 | 1.078 |
| 38.5 | 12.002 | −0.076 | −0.760 | 1.144 |
| 45.0 | 15.002 | −0.083 | −0.826 | 1.243 |
| 50.3 | 18.000 | −0.093 | −0.927 | 1.395 |
| 54.6 | 21.000 | −0.107 | −1.073 | 1.615 |

Decentering-Image Shift Sensitivity Data for Each Image Height in Direction Orthogonal to Decentering Direction at Wide-Angle End

| Half Angle of View ω [deg] | Image Height $h_\theta$ [mm] | Image Point Moving Amount after Decentering of 0.1 mm $\Delta y_{TS\theta}$ [mm] | Decentering-Image Shift Sensitivity $TS_\theta$ ($h_\theta$) [mm/mm] | Decentering-Image Shift Sensitivity Coefficient $k_{TS\_\theta}$ ($h_\theta$) |
|---|---|---|---|---|
| 0 | 0.000 | −0.066 | −0.665 | 1.000 |
| 11.0 | 3.000 | −0.067 | −0.667 | 1.004 |
| 21.4 | 6.000 | −0.068 | −0.675 | 1.016 |
| 30.6 | 9.000 | −0.069 | −0.688 | 1.035 |
| 38.5 | 12.000 | −0.071 | −0.705 | 1.061 |
| 45.0 | 15.001 | −0.073 | −0.729 | 1.097 |
| 50.3 | 18.001 | −0.076 | −0.759 | 1.142 |
| 54.6 | 21.000 | −0.080 | −0.795 | 1.197 |

Numerical Example 3

Unit: mm

SURFACE DATA

| Surface Number | r | d | nd | vd |
|---|---|---|---|---|
| 1 | 50.658 | 1.57 | 1.48749 | 70.2 |
| 2 | 17.433 | 7.73 | | |
| 3 | 82.620 | 1.50 | 1.48749 | 70.2 |
| 4 | 22.068 | 13.94 | | |
| 5 | 28.055 | 5.75 | 1.90043 | 37.4 |
| 6 | −26.190 | 1.00 | 1.80000 | 29.8 |
| 7 | −678.364 | 6.06 | | |
| 8 (diaphragm) | ∞ | 2.86 | | |
| 9 | 74.460 | 1.40 | 1.77250 | 49.6 |
| 10 | −3498.619 | 2.98 | | |
| 11 | −20.479 | 1.00 | 1.85478 | 24.8 |
| 12 | 30.759 | 3.15 | 1.49700 | 81.5 |
| 13 | −76.152 | 0.29 | | |
| 14 | 107.343 | 4.13 | 1.58313 | 59.4 |
| 15* | −42.035 | 0.15 | | |
| 16 | 108.394 | 4.96 | 1.85150 | 40.8 |
| 17 | −35.438 | (variable) | | |
| 18 | −72.427 | 1.84 | 1.83481 | 42.7 |
| 19 | −45.108 | 10.50 | | |
| 20 | −23.819 | 1.57 | 1.51742 | 52.4 |
| 21 | −53.298 | 11.00 | | |
| Image Plane | ∞ | | | |

ASPHERICAL SURFACE DATA

15th Surface
K = 0.00000e+000 A4 = 2.14904e−005 A6 = −6.26885e−009
A8 = 3.11936e−010 A10 = −1.96590e−012 A12 = 3.25155e−015

VARIOUS DATA

| | |
|---|---|
| Focal Length: | 20.60 |
| F-Number: | 1.85 |
| Half Angle of View (°): | 46.42 |
| Image Height: | 18.71 |
| Overall Optical Length: | 84.88 |
| BF: | 11.00 |

-continued

| Unit: mm | | |
|---|---|---|
| | Wide-Angle | Telephoto |
| d17 | 1.50 | 11.92 |

Tilt-Image Shift Sensitivity Data for Each Image Height in Tilt Direction when Object at Infinite Distance is in Focus

| Half Angle of View ω [deg] | Image Height $h_r$ [mm] | Image Point Moving Amount after Shake of 0.5 deg $\Delta y_{LSr}$ [mm] | Tilt-Image Shift Sensitivity $LS_r$ ($h_r$) [mm/deg] | Tilt-Image Shift Sensitivity Coefficient $k_{LS\_r}$ ($h_r$) |
|---|---|---|---|---|
| 0 | 0.000 | −0.180 | −0.359 | 1.000 |
| 8.3 | 2.988 | −0.181 | −0.362 | 1.007 |
| 16.2 | 5.906 | −0.186 | −0.371 | 1.033 |
| 23.6 | 8.699 | −0.194 | −0.388 | 1.078 |
| 30.2 | 11.333 | −0.205 | −0.409 | 1.138 |
| 36.1 | 13.796 | −0.217 | −0.435 | 1.209 |
| 41.2 | 16.111 | −0.234 | −0.468 | 1.302 |
| 45.6 | 18.283 | −0.254 | −0.509 | 1.416 |

Tilt-Image Shift Sensitivity Data for Each Image Height in Direction Orthogonal to Tilt Direction when Object at Infinite Distance is in Focus

| Half Angle of View ω [deg] | Image Height $h_\theta$ [mm] | Image Point Moving Amount after Shake of 0.5 deg $\Delta y_{LS\theta}$ [mm] | Tilt-Image Shift Sensitivity $LS_\theta$ ($h_\theta$) [mm/deg] | Tilt-Image Shift Sensitivity Coefficient $k_{LS\_\theta}$ ($h_\theta$) |
|---|---|---|---|---|
| 0 | 0.000 | −0.180 | −0.360 | 1.000 |
| 8.3 | 2.988 | −0.179 | −0.358 | 0.996 |
| 16.2 | 5.906 | −0.177 | −0.354 | 0.984 |
| 23.6 | 8.699 | −0.174 | −0.347 | 0.966 |
| 30.2 | 11.333 | −0.170 | −0.339 | 0.944 |
| 36.1 | 13.796 | −0.165 | −0.331 | 0.919 |
| 41.2 | 16.111 | −0.161 | −0.321 | 0.894 |
| 45.6 | 18.283 | −0.156 | −0.313 | 0.869 |

Decentering-Image Shift Sensitivity Data for Each Image Height in Decentering Direction when Object at Infinite Distance is in Focus

| Half Angle of View ω [deg] | Image Height $h_r$ [mm] | Image Point Moving Amount after Decentering of 0.1 mm $\Delta y_{TSr}$ [mm] | Decentering-Image Shift Sensitivity $TS_r$ ($h_r$) [mm/mm] | Decentering-Image Shift Sensitivity Coefficient $k_{TS\_r}$ ($h_r$) |
|---|---|---|---|---|
| 0 | 0.000 | 0.030 | 0.299 | 1.000 |
| 8.3 | 2.988 | 0.030 | 0.302 | 1.010 |
| 16.2 | 5.906 | 0.031 | 0.311 | 1.040 |
| 23.6 | 8.699 | 0.033 | 0.325 | 1.087 |
| 30.2 | 11.333 | 0.034 | 0.344 | 1.149 |
| 36.1 | 13.796 | 0.037 | 0.366 | 1.223 |
| 41.2 | 16.111 | 0.039 | 0.390 | 1.305 |
| 45.6 | 18.283 | 0.042 | 0.416 | 1.392 |

Decentering-Image Shift Sensitivity Data for Each Image Height in Direction Orthogonal to Decentering Direction when Object at Infinite Distance is in Focus

| Half Angle of View ω [deg] | Image Height $h_\theta$ [mm] | Image Point Moving Amount after Decentering of 0.1 mm $\Delta y_{TS\theta}$ [mm] | Decentering-Image Shift Sensitivity $TS_\theta$ ($h_\theta$) [mm/mm] | Decentering-Image Shift Sensitivity Coefficient $k_{TS\_\theta}$ ($h_\theta$) |
|---|---|---|---|---|
| 0 | 0.000 | 0.030 | 0.299 | 1.000 |
| 8.3 | 2.988 | 0.030 | 0.301 | 1.005 |
| 16.2 | 5.906 | 0.031 | 0.305 | 1.021 |
| 23.6 | 8.699 | 0.031 | 0.313 | 1.046 |
| 30.2 | 11.333 | 0.032 | 0.323 | 1.079 |
| 36.1 | 13.796 | 0.033 | 0.334 | 1.117 |
| 41.2 | 16.111 | 0.035 | 0.347 | 1.160 |
| 45.6 | 18.283 | 0.036 | 0.361 | 1.206 |

As described above, by using the configuration of the present disclosure, image blur at a predetermined image point position including a center of an optical axis can be easily reduced well.

In each embodiment, the information on the image shift sensitivity relative to the decentering of the image stabilizing optical system 1014 associated with the image point position is the image stabilization coefficient table including the image stabilization coefficient information associated with the image point position in a matrix format, but the present disclosure is not limited to this. The information on the image shift sensitivity relative to the decentering of the image stabilizing optical system 1014 associated with the image point position may be the decentering-image shift sensitivity $TS_r$ ($h_r$) and $TS_\theta$ ($h_\theta$) or may be the off-axis image stabilization coefficient information ($K_{TS1}$, $K_{TS2}$, $K_{TS3}$, $K_{TS4}$) acquired from decentering-image shift sensitivity. Alternatively, the information on the image shift sensitivity relative to the decentering of the image stabilizing optical system 1014 associated with the image point position may be the image stabilization coefficient information ($K_1$, $K_2$, $K_3$, $K_4$) calculated in combination with the information on the image shift sensitivity relative to the tilt of the image pickup optical system 101 associated with the image point position. That is, the information on the image shift sensitivity relative to the decentering of the image stabilizing optical system 1014 associated with the image point position may be any information with which it is possible to acquire the moving amount of the predetermined image point position relative to the decentering of the image stabilizing optical system 1014.

In each embodiment, the information on the image shift sensitivity relative to the tilt of the image pickup optical system 101 associated with the image point position is the image stabilization coefficient table including the image stabilization coefficient information associated with the image point position in the matrix format, but the present disclosure is not limited to this. The information on the image shift sensitivity relative to the tilt of the image pickup optical system 101 associated with the image point position may be an image height expression based on the focal length or the projection method which are specified in the image pickup optical system 101 or may be the tilt-image shift sensitivity $LS_r$ ($h_r$) and $LS_\theta$ ($h_\theta$). Alternatively, the information on the image shift sensitivity relative to the tilt of the image pickup optical system 101 associated with the image point position may be the off-axis image stabilization coefficient information ($K_{LS1}$, $K_{LS2}$, $K_{LS3}$, $K_{LS4}$) acquired from the tilt-image shift sensitivity. That is, the information on the image shift sensitivity relative to the tilt of the image pickup optical system 101 associated with the image point position may be any information with which it is possible to acquire the moving amount of the predetermined image point position relative to the tilt of the image pickup optical system 101.

In each embodiment, the decentering-image shift sensitivity and the tilt-image shift sensitivity are described as information for each image height in the decentering direction of the image stabilizing optical system 1014 (R direction) or in the direction orthogonal to the decentering direction. However, the decentering-image shift sensitivity and the tilt-image shift sensitivity may be information determined for each image point position on the entire image pickup plane in the predetermined direction on the image pickup plane. In that case, the decentering-image shift sensitivity or tilt-image shift sensitivity may be acquired directly from the image point moving amount on the entire image pickup plane acquired by using the design value of the image pickup optical system 101.

In each numerical example, the image point position is acquired by using the imaging position of the principal ray but may be acquired by using a peak position of a modulation transfer function (MTF)

The camera microcomputer 202 may perform image stabilization by using an electronic image stabilization function that changes an effective pixel area of the image sensor 201. That is, the camera microcomputer 202 may function as one of the image stabilizing units.

The projection method of the image pickup optical system 101 is not limited to the central projection method and may be another projection method such as an equidistant projection method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-050960, filed on Mar. 25, 2021 which is hereby incorporated by reference herein in its entirety.

What is claimed is:

1. A control apparatus comprising at least one processor or circuit configured to execute a plurality of tasks including:

a first acquisition task configured to acquire information on image shift sensitivity relative to decentering of an image stabilizing optical system, the information being associated with an image point position of an image pickup optical system, the image pickup optical system including the image stabilizing optical system configured to perform image stabilization; and a second acquisition task configured to acquire a first image stabilizing driving amount of the image stabilizing optical system during the image stabilization, wherein the second acquisition task is configured to acquire the first image stabilizing driving amount associated with a predetermined image point position by using the information on the image shift sensitivity associated with the predetermined image point position, and wherein the information on the image shift sensitivity is acquired by using information with which a moving amount of the predetermined image point position relative to a tilt of the image pickup optical system can be acquired.

2. The control apparatus according to claim 1, wherein the information on the image shift sensitivity is acquired by using a design value of the image pickup optical system.

3. The control apparatus according to claim 1, wherein the information on the image shift sensitivity is information with which a moving amount of the predetermined image point position relative to the decentering of the image stabilizing optical system can be acquired.

4. The control apparatus according to claim 1, wherein the information on the image shift sensitivity is information determined for each position on an image plane.

5. The control apparatus according to claim 1, wherein the first image stabilizing driving amount is acquired by using (a) information on a shake and (b) the information on the image shift sensitivity.

6. The control apparatus according to claim 5, wherein the information on the shake includes information on angular velocities about a plurality of rotation axes.

7. The control apparatus according to claim 5, wherein the information on the shake includes information on acceleration in directions of a plurality of axes.

8. The control apparatus according to claim 1, wherein the first image stabilizing driving amount is acquired by using (a) information on a shake, (b) information on the predetermined image point position, and (c) the information on the image shift sensitivity.

9. The control apparatus according to claim 1, wherein the predetermined image point position is a position on an image plane and is expressed by a plurality of parameters.

10. The control apparatus according to claim 1, wherein the information on the image shift sensitivity is different depending on a focal length of the image pickup optical system.

11. The control apparatus according to claim 1, wherein the information on the image shift sensitivity is different depending on a distance to an object to be focused.

12. The control apparatus according to claim 1, wherein the at least one processor or circuit is further configured to execute:

a third acquisition task configured to acquire information with which a moving amount of the predetermined image point position relative to a tilt of the image pickup optical system can be acquired; and a fourth acquisition task configured to acquire a second image stabilizing driving amount of an image stabilizing unit during image stabilization, the image stabilizing unit being configured to perform the image stabilization, wherein the fourth acquisition task is configured to acquire the second image stabilizing driving amount associated with the predetermined image point position by using the information with which the moving amount of the predetermined image point position relative to the tilt of the image pickup optical system can be acquired.

13. The control apparatus according to claim 12, wherein the image stabilizing unit is configured to decenter an image sensor from an optical axis of the image pickup optical system.

14. The control apparatus according to claim 12, wherein the image stabilizing unit is configured to change an effective pixel area of an image sensor.

15. The control apparatus according to claim 12, wherein the at least one processor or circuit is further configured to execute a setting task configured to set a ratio between image stabilization performed by the image stabilizing optical system and image stabilization performed by the image stabilizing unit, and wherein the first image stabilizing driving amount and the second image stabilizing driving amount are set based on the ratio.

16. An image pickup apparatus comprising:

an image sensor; and the control apparatus according to claim 1.

17. The image pickup apparatus according to claim 16, further comprising a memory unit configured to store the information on the image shift sensitivity relative to the decentering of the image stabilizing optical system, the information being associated with the image point position of the image pickup optical system.

18. A lens apparatus comprising:

an image pickup optical system; and the control apparatus according to claim 1.

19. The lens apparatus according to claim 18, further comprising a memory unit configured to store the information on the image shift sensitivity relative to the decentering of the image stabilizing optical system, the information being associated with the image point position of the image pickup optical system.

20. A camera system comprising:

at least one processor or circuit configured to execute a plurality of tasks including:

a first acquisition task configured to acquire information on image shift sensitivity relative to decentering of an image stabilizing optical system, the information being associated with an image point position of an image pickup optical system, the image pickup optical system including the image stabilizing optical system configured to perform image stabilization; and a second acquisition task configured to acquire a first image stabilizing driving amount of the image stabilizing optical system during the image stabilization;

a lens apparatus; and an image pickup apparatus, wherein the lens apparatus is configured to acquire the first image stabilizing driving amount associated with a predetermined image point position by using the information on the image shift sensitivity associated with the predetermined image point position, wherein the second acquisition task includes:

a third acquisition task configured to acquire information with which a moving amount of the predetermined image point position relative to a tilt of the image pickup optical system can be acquired; and a fourth acquisition task configured to acquire a second image stabilizing driving amount of an image stabilizing unit during image stabilization, the image stabilizing unit being configured to perform the image stabilization, wherein the image pickup apparatus is configured to acquire the second image stabilizing driving amount associated with the predetermined image point position by using the information with which the moving amount of the predetermined image point position relative to the tilt of the image pickup optical system can be acquired.

21. A control method for acquiring an image stabilizing driving amount of an image stabilizing optical system during image stabilization, the image stabilizing optical system being configured to perform the image stabilization, the control method comprising:

acquiring information on image shift sensitivity relative to decentering of the image stabilizing optical system, the information being associated with an image point position of an image pickup optical system; and acquiring an image stabilizing driving amount of the image stabilizing optical system associated with a predetermined image point position by using the information on the image shift sensitivity associated with the predetermined image point position, wherein the information on the image shift sensitivity is acquired by using information with which a moving amount of the predetermined image point position relative to a tilt of the image pickup optical system can be acquired.

22. A non-transitory computer-readable storage medium storing a computer program that causes a computer to execute the control method according to claim 21.

* * * * *